US012704866B2

(12) United States Patent
Maung et al.

(10) Patent No.: US 12,704,866 B2
(45) Date of Patent: Aug. 11, 2026

(54) METHODS AND APPARATUS TO COMPENSATE FOR GROUND SHIFT

(71) Applicant: Texas Instruments Incorporated, Dallas, TX (US)

(72) Inventors: Win N Maung, Plano, TX (US); Saminah Chaudhry, McKinney, TX (US); Yonghui Tang, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 70 days.

(21) Appl. No.: 18/677,325

(22) Filed: May 29, 2024

(65) Prior Publication Data

US 2024/0402739 A1 Dec. 5, 2024

Related U.S. Application Data

(60) Provisional application No. 63/470,517, filed on Jun. 2, 2023.

(51) Int. Cl.

*G05F 1/56* (2006.01)
*G06F 13/38* (2006.01)
*G06F 13/42* (2006.01)

(52) U.S. Cl.

CPC .............. *G05F 1/56* (2013.01); *G06F 13/382* (2013.01); *G06F 13/4282* (2013.01); *G06F 2213/0042* (2013.01)

(58) Field of Classification Search

CPC ... G05F 1/10; G05F 1/46; G05F 1/467; G05F 1/565; G05F 1/56; G06F 13/382;

(Continued)

(56) References Cited

U.S. PATENT DOCUMENTS 12,026,115 B2 * 7/2024 Tang .................. G06F 13/4295
2020/0327082 A1 10/2020 Tang et al.

(Continued)

FOREIGN PATENT DOCUMENTS

WO 2020185254 A1 9/2020

OTHER PUBLICATIONS

International Search Report for PCT/US2024/031847, dated Sep. 30, 2024.

*Primary Examiner* — Long Nguyen
(74) *Attorney, Agent, or Firm* — Xianghui Huang; Frank D. Cimino

(57) ABSTRACT

An example apparatus includes: a bus connection including a common terminal; a first data terminal; and a second data terminal; an amplifier having an input terminal and an output terminal, the input terminal of the amplifier coupled to the common terminal; charge pump circuitry having an input terminal, a first output terminal, and a second output terminal, the input terminal of the charge pump circuitry coupled to the output terminal of the amplifier; receiver circuitry having an input terminal, a first supply terminal, and a second supply terminal, the input terminal of the receiver circuitry coupled to the first data terminal; and transmitter circuitry having an output terminal, a first supply terminal, and a second supply terminal, the output terminal of the transmitter circuitry coupled to the second data terminal, the first supply terminal of the transmitter circuitry coupled to the first output terminal of the charge pump circuitry.

20 Claims, 7 Drawing Sheets

(58) Field of Classification Search
CPC ........ G06F 13/4282; G06F 2213/0042; H03K 19/0175; H03K 19/017509; H03K 19/017545; H03K 19/00369; H03K 17/14
See application file for complete search history.

(56) References Cited

U.S. PATENT DOCUMENTS

| | | | |
|---|---|---|---|
| 2021/0311902 | A1 | 10/2021 | Maung et al. |
| 2022/0066532 | A1 | 3/2022 | Shah et al. |
| 2022/0165318 | A1 | 5/2022 | Garg et al. |
| 2023/0106813 | A1 | 4/2023 | Polasa et al. |
| 2024/0348248 | A1 * | 10/2024 | Srivongse ............... H02P 27/06 |

* cited by examiner

200
$V_{BUS\_1}$
200F
USB SIGNAL CONDITIONING
LDO
$V_{DD}$
208
204
INTERFACE CIRCUITRY
220
224
228
240
244
248
252
S-D CONVERTER
D-S CONVERTER
256
260
264
268
272
276
280
284
D-S CONVERTER
S-D CONVERTER
286
290
294
298
SIGNAL LOGIC
COMMUNICATION CIRCUITRY
200B
200A
212
232B
200C
200D
$V_{COMP\_GND}$
VOLTAGE COMPENSATION CIRCUITRY
$V_{COMP\_VDD}$
232
232A
GROUND SHIFT COMPENSATION CIRCUITRY
236
200G
200H
200E
$V_{GND\_1}$
$R_S$
216

300
310
USB CONTROLLER
305
$V_{BUS\_1}$
USB SIGNAL CONDITIONING
305H
208
LDO $V_{DD}$
220
294
290
286
305C
298
D-S CONVERTER
S-D CONVERTER
305D
284
280
276
272
S-D CONVERTER
D-S CONVERTER
305E
268
264
260
256
D-S CONVERTER
S-D CONVERTER
305F
252
248
244
240
D-S CONVERTER
S-D CONVERTER
212
305B
DATA-
VOLTAGE COMPENSATION CIRCUITRY
$V_{COMP\_VDD}$
$V_{COMP\_GND}$
305A
DATA+
232
GROUND SHIFT COMPENSATION CIRCUITRY
236
305G
305J
305I
$R_S$
315
SIGNAL PROCESSING CIRCUITRY

METHODS AND APPARATUS TO COMPENSATE FOR GROUND SHIFT

CROSS-REFERENCE TO RELATED APPLICATION

This patent application claims the benefit of and priority to U.S. Provisional Patent Application No. 63/470,517 filed Jun. 2, 2023, which is hereby incorporated herein by reference in its entirety.

TECHNICAL FIELD

This description relates generally to voltage compensation and, more particularly, to methods and apparatus to compensate for ground shift.

BACKGROUND

As electronics continue to advance, systems have become capable of safely operating at increasingly complex operating conditions, such as higher powers and higher speeds. In communication circuitry, increasingly complex circuitry implements advanced techniques for supplying power and exchanging data between devices. Such circuitry allows devices to supply an increasing amount of power and exchange data at increasing speeds.

SUMMARY

For methods and apparatus to compensate for ground shift, an example integrated circuit includes an a bus connection including: a common terminal; a first data terminal; and a second data terminal; an amplifier having an input terminal and an output terminal, the input terminal of the amplifier coupled to the common terminal of the bus connection; charge pump circuitry having an input terminal, a first output terminal, and a second output terminal, the input terminal of the charge pump circuitry coupled to the output terminal of the amplifier; receiver circuitry having an input terminal, a first supply terminal, and a second supply terminal, the input terminal of the receiver circuitry coupled to the first data terminal of the bus connection; and transmitter circuitry having an output terminal, a first supply terminal, and a second supply terminal, the output terminal of the transmitter circuitry coupled to the second data terminal of the bus connection, the first supply terminal of the transmitter circuitry coupled to the first output terminal of the charge pump circuitry and the first supply terminal of the receiver circuitry, the second supply terminal of the transmitter circuitry coupled to the second output terminal of the charge pump circuitry and the second supply terminal of the receiver circuitry. Other examples are described.

For methods and apparatus to compensate for ground shift, an example apparatus includes a universal serial bus (USB) connection having a common terminal and a data terminal; interface circuitry having a data terminal, a common terminal, a first supply input, and a second supply input, the data terminal of the interface circuitry coupled to the data terminal of the USB connection; a resistor having a first terminal and a second terminal; amplifier circuitry having a first input terminal, a second input terminal, and an output terminal, the first input terminal of the amplifier circuitry coupled to the common terminal of the USB connection and the first terminal of the resistor, the second input terminal of the amplifier circuitry coupled to the common terminal of the interface circuitry and the second terminal of the resistor; and voltage compensation circuitry having an input terminal, a first output terminal, and a second output terminal, the input terminal of the voltage compensation circuitry coupled to the output terminal of the amplifier circuitry, the first output terminal of the voltage compensation circuitry coupled to the first supply input of the interface circuitry, the second output terminal of the voltage compensation circuitry coupled to the second supply input of the interface circuitry. Other examples are described.

For methods and apparatus to compensate for ground shift, an example apparatus includes an amplifier configured to generate a sense voltage responsive to ground currents at a ground terminal; voltage compensation circuitry having an input, a first output, and a second output, the voltage compensation circuitry configured to generate a compensated ground voltage at the first output and a compensated supply voltage at the second output responsive to the sense voltage at the input; and data communication circuitry having a data input, a first supply input, and a second supply input, the first supply input of the data communication circuitry coupled to the first output of the voltage compensation circuitry, the second supply input of the data communication circuitry coupled to the second output of the voltage compensation circuitry. Other examples are described.

Figure 1:
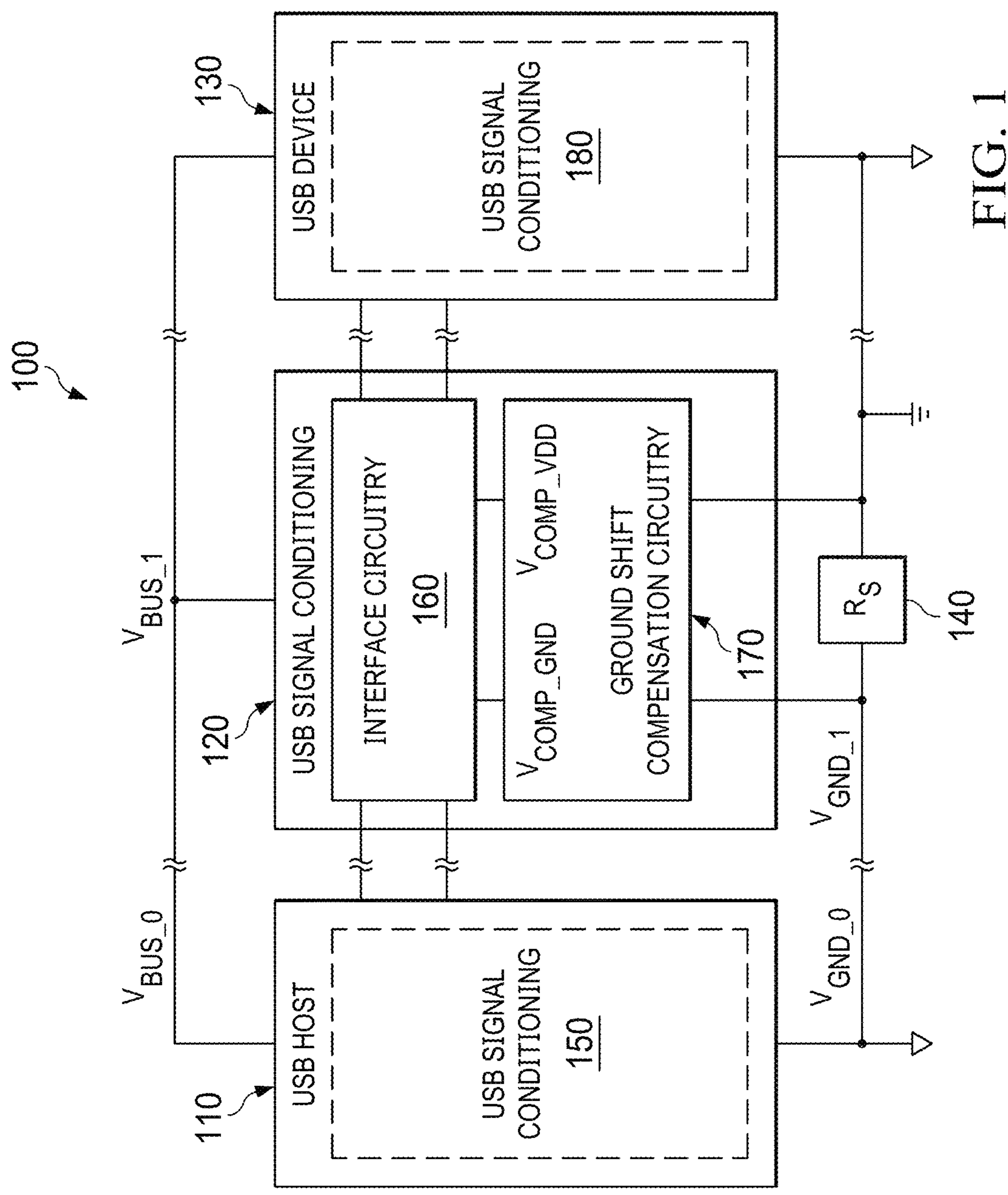
FIG. 1 is a block diagram of an example communication system including example signal conditioning circuitry having example ground shift compensation circuitry.

The drawings are not necessarily to scale. Generally, the same reference numbers in the drawing(s) and this description refer to the same or similar (functionally and/or structurally) features and/or parts. Although the drawings show regions with clean lines and boundaries, some or all of these lines and boundaries may be idealized. In reality, the boundaries or lines may be unobservable, blended or irregular.

DETAILED DESCRIPTION

As electronics continue to advance, systems have become capable of safely operating at increasingly complex operating conditions, such as higher powers and higher speeds. In communication circuitry, increasingly complex circuitry implements advanced techniques for supplying power and exchanging data between devices. Such circuitry allows devices to supply an increasing amount of power and exchange data at increasing speeds.

In some communication systems, a host device supplies power to and exchanges data with a target device across a bus connection. For example, the bus connection includes a plurality of electrical connections that allow the host device to supply power to the target device and facilitate data exchange between the devices. One such bus connection is a universal serial bus (USB) connection, which includes a first data terminal, a second data terminal, a ground terminal, and a bus supply terminal. The data terminals of the USB connection allow the devices to exchange data with one another. The ground terminal and bus supply terminal of the USB connection allows one of the devices to supply power to another one of the devices. As higher voltages and currents become increasingly common, bus connections continue to support supplying increasingly higher currents and voltages from one device to another device. A device that relies on power from the bus connection may cause a current to flow between ground terminals of devices connected across the bus connection responsive to drawing a relatively large current from the bus supply terminal. The current flowing between ground terminals is referred to as a ground current. A ground current is a non-ideal and often unpredictable result of supplying relatively high currents across a bus connection.

In communication systems having a bus connection that uses a connector or extended electrical trace to connect devices, a ground current generates a voltage difference between ground terminals of the devices. For a USB connection that uses a connector having a ground wire resistance of one-tenth of an ohm (Ω) to charge another device, a five-amp current from the bus supply terminal may result in a five-amp ground current. The five-amp ground current shifts the ground voltage of the target device by five hundred milli-volts (mV) in comparison to the device that is supplying power. Such a ground shift between ground voltages of the devices prevents the target device from accurately sampling data at the first and second data terminals, which substantially reduces the likelihood of successfully exchanging data between devices. Some communication protocols, such as USB 2.0, have begun to include specifications that account for some magnitude of ground shift between devices. In USB 2.0, devices can exchange data for ground shifts up to two-hundred and fifty milli-volts. However, as described above, devices continue to rely on increasing currents from the bus supply terminal of the bus connection, thereby exceeding such communication protocol allowances for ground shift is becoming increasingly common.

Examples described herein include methods and apparatus to compensate for ground shift using ground shift compensation circuitry to generate compensated supply and ground voltages. In some described examples, signal conditioning circuitry is positioned along a bus connection between two devices. In such examples, the signal conditioning circuitry includes interface circuitry, which further includes data communication circuitry, and also includes ground shift compensation circuitry. The signal conditioning circuitry facilitates an exchange of data between devices using the data communication circuitry to receive and transmit data. The ground shift compensation circuitry includes amplifier circuitry and voltage compensation circuitry. The amplifier circuitry senses ground currents along a bus connection by detecting a voltage difference across a sense resistance. The sense resistance is coupled in series along the ground connection of the bus. The amplifier circuitry generates a control voltage responsive to a voltage difference across the sense resistance.

The voltage compensation circuitry generates a compensated supply voltage and a compensated ground voltage based on the control voltage, a local supply voltage, and a local ground voltage. The local supply and ground voltages are the voltages of the bus supply terminal and the ground terminal of the bus connection at the signal conditioning circuitry. The compensated supply and ground voltages are approximations of local supply and ground voltages of the bus supply terminal and the ground terminal of the bus connection as seen by another device. The data communication circuitry uses the compensated supply and ground voltages to transmit and receive data from the other device. Advantageously, the compensated supply and ground voltages compensate voltages used to exchange data between devices for ground shift. Advantageously, the ground shift compensation circuitry allows the communication circuitry to receive and transmit data using an approximation of the local supply and ground voltages of another device of the bus connection. Advantageously, the ground shift compensation circuitry allows the bus connection to support higher currents without compromising the data exchange.

FIG. 1 is a block diagram of an example communication system 100. In the example of FIG. 1, the communication system 100 includes a host device 110, signal conditioning circuitry 120, a target device 130, and a sense resistor 140. The example device 110 of FIG. 1 may include example signal conditioning circuitry 150. The example signal conditioning circuitry 120 of FIG. 1 includes example interface circuitry 160 and example ground shift compensation circuitry 170. The example device 130 of FIG. 1 may include example signal conditioning circuitry 180. The communication system 100 implements a bus connection between the devices 110, 130 to supply power and exchange data. In the example of FIG. 1, the communication system 100 is described in connection with a USB connection. Alternatively, the communication system 100 may be modified to implement alternative types of communication protocols.

The device 110 has a first terminal, a second terminal, a third terminal, and a fourth terminal. The first terminal of the device 110 is coupled to the signal conditioning circuitry 120 and the device 130. The second terminal of the device 110 is coupled to the signal conditioning circuitry 120 and the sense resistor 140. The third and fourth terminals of the device 110 are coupled to the signal conditioning circuitry 120. In the example of FIG. 1, a bus connection electrically connects terminals of the device 110 to terminals of the signal conditioning circuitry 120. In some examples, the bus connection is a USB connection having a bus supply terminal, a first data terminal (also referred to as a data input, a data input terminal, a data output, or a data output terminal), a second data terminal, and a common terminal (also referred to as a ground terminal). In such examples, the device 110 may be coupled to the signal conditioning circuitry 120 or the device 130 by a connector, which connects terminals of the USB connection across extended distances.

The signal conditioning circuitry 120 has a first terminal, a second terminal, a third terminal, a fourth terminal, a fifth terminal, a sixth terminal, and a seventh terminal. The first terminal of the signal conditioning circuitry 120 is coupled to the devices 110, 130. The second terminal of the signal conditioning circuitry 120 is coupled to the device 110 and the sense resistor 140. The third terminal of the signal conditioning circuitry 120 is coupled to the device 130 and the sense resistor 140. The fourth and fifth terminals of the signal conditioning circuitry 120 are coupled to the device 110. The sixth and seventh terminals of the signal conditioning circuitry 120 are coupled to the device 130. In some examples, the signal conditioning circuitry 120 is coupled to the device 110 by a first bus connection and the device 130 by a second bus connection. In other examples, the signal conditioning circuitry 120 is coupled to the device 110 by a first bus connection, the device 130 by a second bus connection, and another instance of the device 130 by a third bus connection. Alternatively, the signal conditioning circuitry 120 may be modified to interconnect any number of bus connections or devices.

In the example of FIG. 1, the signal conditioning circuitry 150, 180 are illustrative representations of alternative locations of the signal conditioning circuitry 120. For example, the device 110 includes the signal conditioning circuitry 150, which is another instance of the signal conditioning circuitry 120. In another example, the device 130 includes the signal conditioning circuitry 180, which is another instance of the signal conditioning circuitry 120. In yet another example, the communication system 100 may include any number of instances of the signal conditioning circuitry 120 at any of the locations illustrated by the signal conditioning circuitry 120, 150, 180. Alternatively, the communication system 100 may include an instance of the signal conditioning circuitry 120 at a location not illustrated in FIG. 1. Examples of the signal conditioning circuitry 120, 150, 180 are illustrated and described in connection with FIGS. 2 and 3, below.

The device 130 has a first terminal, a second terminal, a third terminal, and a fourth terminal. The first terminal of the device 130 is coupled to the device 110 and the signal conditioning circuitry 120. The second terminal of the device 130 is coupled to the signal conditioning circuitry 120 and the sense resistor 140. The third and fourth terminals of the device 130 are coupled to the signal conditioning circuitry 120. In the example of FIG. 1, a bus connection electrically connects terminals of the device 130 to terminals of the signal conditioning circuitry 120. In some examples, the bus connection is a USB connection having a bus supply terminal, a first data terminal, a second data terminal, and a common terminal. In such examples, the device 130 may be coupled to the signal conditioning circuitry 120 or the device 110 by a USB connector, which connects the terminals of the USB connection across extended distances.

The sense resistor 140 has a first terminal and a second terminal. The first terminal of the sense resistor 140 is coupled to the device 110 and the signal conditioning circuitry 120. The second terminal of the sense resistor 140 is coupled to the signal conditioning circuitry 120 and the device 130. In the example of FIG. 1, the sense resistor 140 is coupled in series with the ground connection of the bus connection(s) between the devices 110, 130. In some examples, the sense resistor 140 has a relatively small resistance (also referred to as a sense resistance). In other examples, the sense resistor 140 is an electrical trace having a known resistance. In both examples, currents flowing through the sense resistor 140 represent a ground current between the devices 110, 130. Advantageously, the sense resistor 140 creates a voltage difference responsive to a ground current. Advantageously, the voltage difference across the sense resistor 140 is proportional to the ground current.

The interface circuitry 160 has a first terminal, a second terminal, a third terminal, a fourth terminal, a fifth terminal, and a sixth terminal. The first and second terminals of the interface circuitry 160 are coupled to the device 110. The third and fourth terminals of the interface circuitry 160 are coupled to the device 130. The fifth and sixth terminals of the interface circuitry 160 are coupled to the ground shift compensation circuitry 170. Examples of the interface circuitry 160 are illustrated and described in connection with FIGS. 2 and 3 below.

The ground shift compensation circuitry 170 has a first terminal, a second terminal, a third terminal, and a fourth terminal. The first terminal of the ground shift compensation circuitry 170 is coupled to the device 110 and the sense resistor 140. The second terminal of the ground shift compensation circuitry 170 is coupled to the device 130 and the sense resistor 140. The third and fourth terminals of the ground shift compensation circuitry 170 are coupled to the interface circuitry 160. Examples of the ground shift compensation circuitry 170 are illustrated and described in connection with FIGS. 2, 3, and 5, below.

In example operation, the devices 110, 130 use USB communication protocols to exchange data. The signal conditioning circuitry 120 uses the interface circuitry 160 to perform a series of operations to condition signals between the devices 110, 130. In some examples, the interface circuitry 160 is one of level shifter circuitry, digital isolator circuitry, fanout circuitry (also referred to as multiplexing circuitry or a hub), repeater circuitry, etc. In such examples, the interface circuitry 160 increases the likelihood of successfully exchanging data between the devices 110, 130.

In such example operations, the sense resistor 140 generates a voltage difference responsive to ground currents between the devices 110, 130. The ground shift compensation circuitry 170 generates a compensated supply voltage and a compensated ground voltage based on the voltage difference across the sense resistor 140. The ground shift compensation circuitry 170 supplies the compensated supply and ground voltages to the interface circuitry 160. The interface circuitry 160 uses the compensated supply and ground voltage to receive and transmit data from the devices 110, 130. Advantageously, the ground shift compensation circuitry 170 reduces data errors resulting from ground shift. Example operations of the signal conditioning circuitry 120 are further illustrated and described in FIG. 4, below.

Figure 2:
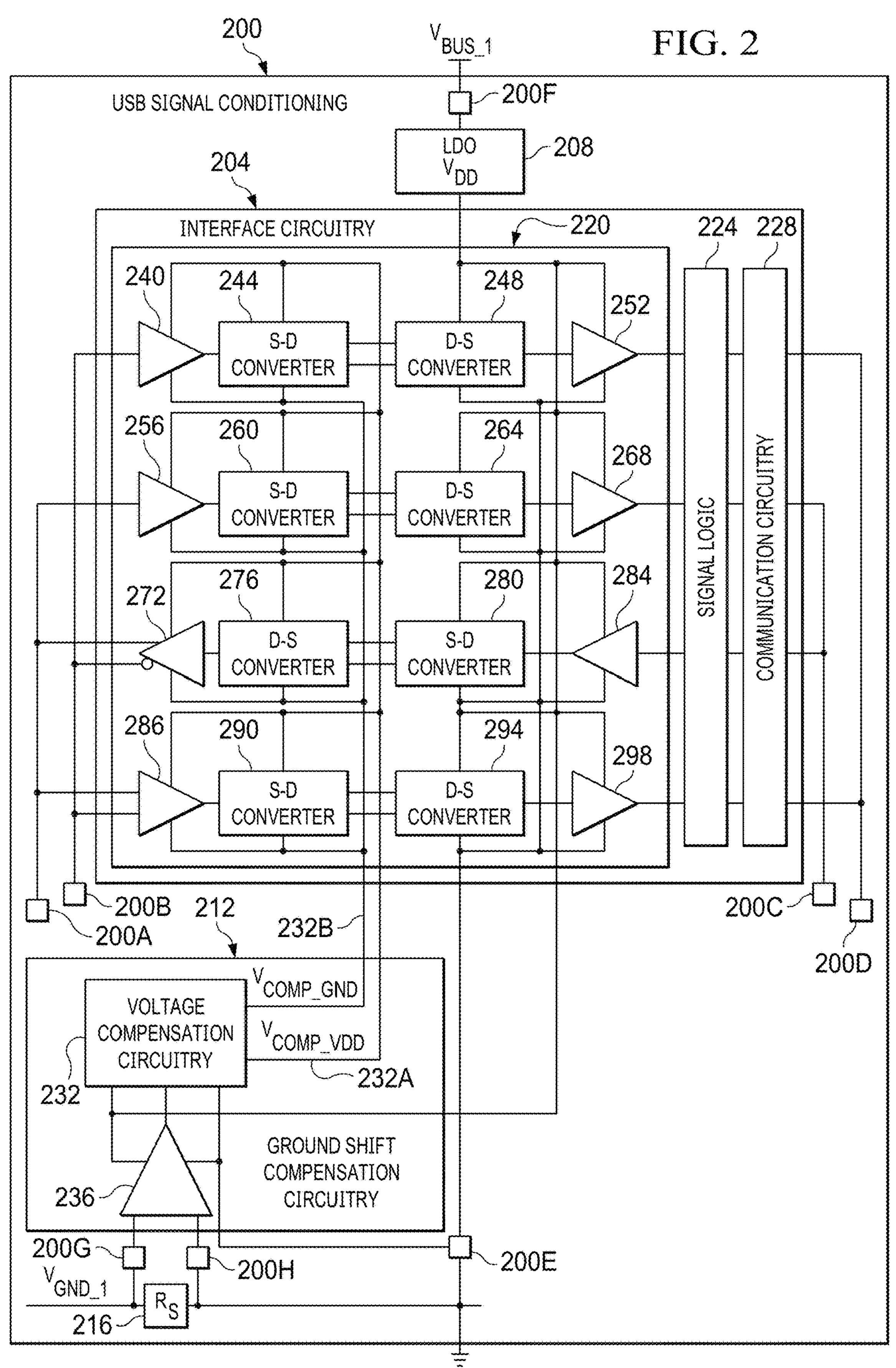
FIG. 2 is a schematic diagram of an example of the signal conditioning circuitry of FIG. 1 including an example of the ground shift compensation circuitry of FIG. 1.

FIG. 2 is a schematic diagram of example signal conditioning circuitry 200, which is an example of the signal conditioning circuitry 120 of FIG. 1. In the example of FIG. 2, the signal conditioning circuitry 200 includes interface circuitry 204, low-dropout (LDO) regulator circuitry 208, ground shift compensation circuitry 212, and a sense resistor 216. The example interface circuitry 204 of FIG. 2 includes example upstream data communication circuitry 220, example signal logic circuitry 224, and example downstream data communication circuitry 228. The example ground shift compensation circuitry 212 of FIG. 2 includes example voltage compensation circuitry 232 and example amplifier circuitry 236. The example data communication circuitry 220 of FIG. 2 includes first example receiver circuitry 240, first example single-ended-to-differential (S-D) converter circuitry 244, first example differential-to-single-ended (D-S) converter circuitry 248, first example transmitter circuitry 252, second example receiver circuitry 256, second example S-D converter circuitry 260, second example D-S converter circuitry 264, second example transmitter circuitry 268, third example transmitter circuitry 272, third example D-S converter circuitry 276, third example S-D converter circuitry 280, third example receiver circuitry 284, fourth example receiver circuitry 286, fourth example S-D converter circuitry 290, fourth example D-S converter circuitry 294, and fourth example transmitter circuitry 298.

The signal conditioning circuitry 200 has a first terminal 200A, a second terminal 200B, a third terminal 200C, a fourth terminal 200D, a fifth terminal 200E, a sixth terminal 200F, a seventh terminal 200G, and an eighth terminal 200H. The terminals 200A, 200B of the signal conditioning circuitry 200 are structured to be coupled to an upstream device, such as one of the devices 110, 130. An upstream device is a first device in a communication system, which may also be referred to as a host device. In the example of FIG. 1, the device 110 is considered to be upstream of the signal conditioning circuitry 120. In other examples, the upstream device may be a device in proximity to the signal conditioning circuitry 200. The terminals 200C, 200D of the signal conditioning circuitry 200 are structured to be coupled to a downstream device, such as one of the devices 110, 130. A downstream device is a second device in a communication system, which may also be referred to as a secondary device. In the example of FIG. 1, the device 130 is considered to be downstream of the signal conditioning circuitry 120. In other examples, the downstream device may be a device not in proximity to the signal conditioning circuitry 200.

The terminal 200E of the signal conditioning circuitry 200 is also referred to as a ground terminal of a bus connection between the devices 110, 130 and supplies a local ground voltage. The local ground voltage is a voltage of the ground terminal at the position of the signal conditioning circuitry 200 in a bus connection. The terminal 200F of the signal conditioning circuitry 200 is also referred to as a bus supply terminal of a bus connection between the devices 110, 130 and supplies a local bus supply voltage. The local bus supply voltage is a voltage of the bus supply terminal at the position of the signal conditioning circuitry 200 in a bus connection. The terminals 200G, 200H of the signal conditioning circuitry 200 are coupled along a ground connection of the bus connection and are structured to be coupled across the sense resistor 216.

The interface circuitry 204 has a first terminal, a second terminal, a third terminal, a fourth terminal, a fifth terminal, a sixth terminal, a seventh terminal, and an eighth terminal. The first terminal of the interface circuitry 204 is coupled to the terminal 200A of the signal conditioning circuitry 200. The second terminal of the interface circuitry 204 is coupled to the terminal 200B of the signal conditioning circuitry 200. The third terminal of the interface circuitry 204 is coupled to the terminal 200C of the signal conditioning circuitry 200. The fourth terminal of the interface circuitry 204 is coupled to the terminal 200D of the signal conditioning circuitry 200. The fifth terminal of the interface circuitry 204 is coupled to the terminal 200E of the signal conditioning circuitry 200. The sixth terminal of the interface circuitry 204 is coupled to the LDO regulator circuitry 208. The seventh and eighth terminals of the interface circuitry 204 are coupled to the ground shift compensation circuitry 212. The interface circuitry 204 is an example of the interface circuitry 160 of FIG. 1.

The LDO regulator circuitry 208 has a first terminal and a second terminal. The first terminal of the LDO regulator circuitry 208 is coupled to the terminal 200F of the signal conditioning circuitry 200, which supplies the local bus supply voltage. The second terminal of the LDO regulator circuitry 208 is coupled to the interface circuitry 204 and the ground shift compensation circuitry 212. The LDO regulator circuitry 208 supplies a supply voltage based on the local bus supply voltage. In the example of FIG. 2, the LDO regulator circuitry 208 is a low dropout linear regulator. Alternatively, the signal conditioning circuitry 200 may be modified to remove or replace the LDO regulator circuitry 208 with an alternative type of voltage regulator.

The ground shift compensation circuitry 212 has a first terminal, a second terminal, a third terminal, a fourth terminal, a fifth terminal, and a sixth terminal. The first terminal of the ground shift compensation circuitry 212 is coupled to the terminal 200E of the signal conditioning circuitry 200, which supplies the local ground voltage. The second terminal of the ground shift compensation circuitry 212 is coupled to the terminal 200G of the signal conditioning circuitry 200 and the sense resistor 216. The third terminal of the ground shift compensation circuitry 212 is coupled to the terminal 200H of the signal conditioning circuitry 200 and the sense resistor 216. The fourth terminal of the ground shift compensation circuitry 212 is coupled to the interface circuitry 204 and the LDO regulator circuitry 208. The fifth and sixth terminals of the ground shift compensation circuitry 212 are coupled to the interface circuitry 204. The fifth terminal of the ground shift compensation circuitry 212 is referred to as a compensated supply terminal 232A, which supplies a compensated supply voltage ($V_{COMP\_VDD}$). The sixth terminal of the ground shift compensation circuitry 212 is referred to as a compensated ground terminal 232B, which supplies a compensated ground voltage ($V_{COMP\_GND}$).

The ground shift compensation circuitry 212 is an example of the ground shift compensation circuitry 170 of FIG. 1. Examples of the ground shift compensation circuitry 212 are also illustrated and described in connection with FIGS. 3 and 5, below.

The sense resistor 216 has a first terminal and a second terminal. The first terminal of the sense resistor 216 is coupled to the terminal 200G of the signal conditioning circuitry 200 and the ground shift compensation circuitry 212. The second terminal of the sense resistor 216 is coupled to the terminal 200H of the signal conditioning circuitry 200 and the ground shift compensation circuitry 212. The sense resistor 216 is an example of the sense resistor 140 of FIG. 1. In some examples, such as in FIG. 2, the sense resistor 216 is internal to the signal conditioning circuitry 200. In other examples, such as in FIG. 1, the sense resistor 140 is external to the signal conditioning circuitry 120. Examples of the sense resistor 216 are illustrated and described in connection with FIGS. 3 and 5, below.

The data communication circuitry 220 has a first terminal, a second terminal, a third terminal, a fourth terminal, a fifth terminal, a sixth terminal, a seventh terminal, an eighth terminal, a ninth terminal, and a tenth terminal. The first terminal of the data communication circuitry 220 is coupled to the terminal 200A of the signal conditioning circuitry 200. The second terminal of the data communication circuitry 220 is coupled to the terminal 200B of the signal conditioning circuitry 200. The third, fourth, fifth, and sixth terminals of the data communication circuitry 220 are coupled to the signal logic circuitry 224. In some examples, the first, second, third, fourth, fifth, and sixth terminals of the data communication circuitry 220 may be referred to as one of a data input terminal, a data input, a data output terminal, or a data output. The seventh terminal of the data communication circuitry 220 is coupled to the terminal 200E of the signal conditioning circuitry 200, which supplies the local ground voltage. The eighth terminal of the data communication circuitry 220 is coupled to the LDO regulator circuitry 208. The ninth and tenth terminals of the data communication circuitry 220 are coupled to the ground shift compensation circuitry 212. Another example of the data communication circuitry 220 is illustrated and described in connection with FIG. 3, below.

The signal logic circuitry 224 has a first terminal, a second terminal, a third terminal, a fourth terminal, a fifth terminal, a sixth terminal, a seventh terminal, and an eighth terminal. The first, second, third, and fourth terminals of the signal logic circuitry 224 are coupled to the data communication circuitry 220. The fifth, sixth, seventh, and eighth terminals of the signal logic circuitry 224 are coupled to the data communication circuitry 228. The signal logic circuitry 224 may be structured as or referred to as repeater logic, hub logic, a level shifter, or a digital isolator. In some examples, such as the signal conditioning circuitry 150, 180 of FIG. 1, the signal logic circuitry 224 is integrated in signal processing circuitry of the devices 110, 130. Such an example is illustrated and described in further detail in connection with FIG. 3, below.

The data communication circuitry 228 has a first terminal, a second terminal, a third terminal, a fourth terminal, a fifth terminal, and a sixth terminal. The first terminal of the data communication circuitry 228 is coupled to the terminal 200C of the signal conditioning circuitry 200. The second terminal of the data communication circuitry 228 is coupled to the terminal 200D of the signal conditioning circuitry 200. The third, fourth, fifth, and sixth terminals of the data communication circuitry 228 are coupled to the signal logic circuitry 224. In some examples, the data communication circuitry 228 may include additional terminals to receive compensated voltages from another instance of the ground shift compensation circuitry 212. In such examples, the additional instance of the ground shift compensation circuitry 212 compensates the data communication circuitry 228 for ground currents between the signal conditioning circuitry 200 and a downstream device.

The voltage compensation circuitry 232 has a first terminal, a second terminal, a third terminal, a fourth terminal, and a fifth terminal. The first terminal of the voltage compensation circuitry 232 is coupled to the terminal 200E of the signal conditioning circuitry 200, which supplies the local ground voltage. The second and third terminals of the voltage compensation circuitry 232 are coupled to the interface circuitry 204. The fourth terminal of the voltage compensation circuitry 232 is coupled to the LDO regulator circuitry 208. The fifth terminal of the voltage compensation circuitry 232 is coupled to the amplifier circuitry 236. An example of the voltage compensation circuitry 232 is illustrated and described in connection with FIGS. 3 and 5, below.

The amplifier circuitry 236 has a first input terminal, a second input terminal, an output terminal, a first supply terminal, and a second supply terminal. The first input terminal of the amplifier circuitry 236 is coupled to the terminal 200G of the signal conditioning circuitry 200 and the sense resistor 216. The second input terminal of the amplifier circuitry 236 is coupled to the terminal 200H of the signal conditioning circuitry 200 and the sense resistor 216. The output terminal of the amplifier circuitry 236 is coupled to the voltage compensation circuitry 232. The first supply terminal of the amplifier circuitry 236 is coupled to the terminal 200E of the signal conditioning circuitry 200, which supplies the local ground voltage. The second supply terminal of the amplifier circuitry 236 is coupled to the interface circuitry 204 and the LDO regulator circuitry 208. In some examples, the supply terminals may be referred to as a supply input terminal or a supply input. Examples of the amplifier circuitry 236 are illustrated and described in connection with FIGS. 3 and 5, below.

The receiver circuitry 240 has an input terminal, an output terminal, a first supply terminal, and a second supply terminal. The input terminal of the receiver circuitry 240 is coupled to the terminal 200B of the signal conditioning circuitry 200, the transmitter circuitry 272, and the receiver circuitry 286. The output terminal of the receiver circuitry 240 is coupled to the S-D converter circuitry 244. The first supply terminal of the receiver circuitry 240 is coupled to the compensated supply terminal 232A of the ground shift compensation circuitry 212, which supplies the compensated supply voltage. The second supply terminal of the receiver circuitry 240 is coupled to the compensated ground terminal 232B of the ground shift compensation circuitry 212, which supplies the compensated ground voltage. In some examples, the receiver circuitry 240 is referred to as amplifier circuitry.

The S-D converter circuitry 244 has an input terminal, a first output terminal, a second output terminal, a first supply terminal, and a second supply terminal. The input terminal of the S-D converter circuitry 244 is coupled to the receiver circuitry 240. The first and second output terminals of the S-D converter circuitry 244 are coupled to the D-S converter circuitry 248. The first supply terminal of the S-D converter circuitry 244 is coupled to the compensated supply terminal 232A of the ground shift compensation circuitry 212, which supplies the compensated supply voltage. The second supply terminal of the S-D converter circuitry 244 is coupled to the compensated ground terminal 232B of the ground shift compensation circuitry 212, which supplies the compensated ground voltage.

The D-S converter circuitry 248 has a first input terminal, a second input terminal, an output terminal, a first supply terminal, and a second supply terminal. The first and second input terminals of the D-S converter circuitry 248 are coupled to the S-D converter circuitry 244. The output terminal of the D-S converter circuitry 248 is coupled to the transmitter circuitry 252. The first supply terminal of the D-S converter circuitry 248 is coupled to the LDO regulator circuitry 208, which supplies the local supply voltage. The second supply terminal of the D-S converter circuitry 248 is coupled to the terminal 200E of the signal conditioning circuitry 200, which supplies the local ground voltage ($V_{GND\_1}$).

The transmitter circuitry 252 has an input terminal, an output terminal, a first supply terminal, and a second supply terminal. The input terminal of the transmitter circuitry 252 is coupled to the D-S converter circuitry 248. The output terminal of the transmitter circuitry 252 is coupled to the signal logic circuitry 224. The first supply terminal of the transmitter circuitry 252 is coupled to the LDO regulator circuitry 208, which supplies the local supply voltage ($V_{BUS\_1}$). The second supply terminal of the transmitter circuitry 252 is coupled to the terminal 200E of the signal conditioning circuitry 200, which supplies the local ground voltage. In some examples, the transmitter circuitry 252 is referred to as amplifier circuitry.

The receiver circuitry 256 has an input terminal, an output terminal, a first supply terminal, and a second supply terminal. The input terminal of the receiver circuitry 256 is coupled to the terminal 200A of the signal conditioning circuitry 200, the transmitter circuitry 272, and the receiver circuitry 286. The output terminal of the receiver circuitry 256 is coupled to the S-D converter circuitry 260. The first supply terminal of the receiver circuitry 256 is coupled to the compensated supply terminal 232A of the ground shift compensation circuitry 212, which supplies the compensated supply voltage. The second supply terminal of the receiver circuitry 256 is coupled to the compensated ground terminal 232B of the ground shift compensation circuitry 212, which supplies the compensated ground voltage. In some examples, the receiver circuitry 256 is referred to as amplifier circuitry.

The S-D converter circuitry 260 has an input terminal, a first output terminal, a second output terminal, a first supply terminal, and a second supply terminal. The input terminal of the S-D converter circuitry 260 is coupled to the receiver circuitry 256. The first and second output terminals of the S-D converter circuitry 260 are coupled to the D-S converter circuitry 264. The first supply terminal of the S-D converter circuitry 260 is coupled to the compensated supply terminal 232A of the ground shift compensation circuitry 212, which supplies the compensated supply voltage. The second supply terminal of the S-D converter circuitry 260 is coupled to the compensated ground terminal 232B of the ground shift compensation circuitry 212, which supplies the compensated ground voltage.

The D-S converter circuitry 264 has a first input terminal, a second input terminal, an output terminal, a first supply terminal, and a second supply terminal. The first and second input terminals of the D-S converter circuitry 264 are coupled to the S-D converter circuitry 260. The output terminal of the D-S converter circuitry 264 is coupled to the transmitter circuitry 268. The first supply terminal of the D-S converter circuitry 264 is coupled to the LDO regulator circuitry 208, which supplies the local supply voltage. The second supply terminal of the D-S converter circuitry 264 is coupled to the terminal 200E of the signal conditioning circuitry 200, which supplies the ground voltage.

The transmitter circuitry 268 has an input terminal, an output terminal, a first supply terminal, and a second supply terminal. The input terminal of the transmitter circuitry 268 is coupled to the D-S converter circuitry 264. The output terminal of the transmitter circuitry 268 is coupled to the signal logic circuitry 224. The first supply terminal of the transmitter circuitry 268 is coupled to the LDO regulator circuitry 208, which supplies the local supply voltage. The second supply terminal of the transmitter circuitry 268 is coupled to the terminal 200E of the signal conditioning circuitry 200, which supplies the ground voltage. In some examples, the transmitter circuitry 268 is referred to as amplifier circuitry.

The transmitter circuitry 272 has an input terminal, a first output terminal, a second output terminal, a first supply terminal, and a second supply terminal. The input terminal of the transmitter circuitry 272 is coupled to the D-S converter circuitry 276. The first output terminal of the transmitter circuitry 272 is coupled to the terminal 200A of the signal conditioning circuitry 200 and the receiver circuitry 256, 286. The second output terminal of the transmitter circuitry 272 is coupled to the terminal 200B of the signal conditioning circuitry 200 and the receiver circuitry 240, 286. The first supply terminal of the transmitter circuitry 272 is coupled to the compensated supply terminal 232A of the ground shift compensation circuitry 212, which supplies the compensated supply voltage. The second supply terminal of the transmitter circuitry 272 is coupled to the compensated ground terminal 232B of the ground shift compensation circuitry 212, which supplies the compensated ground voltage. In some examples, the transmitter circuitry 272 is referred to as amplifier circuitry.

The D-S converter circuitry 276 has a first input terminal, a second input terminal, an output terminal, a first supply terminal, and a second supply terminal. The first and second input terminals of the D-S converter circuitry 276 are coupled to the S-D converter circuitry 280. The output terminal of the D-S converter circuitry 276 is coupled to the transmitter circuitry 272. The first supply terminal of the D-S converter circuitry 276 is coupled to the compensated supply terminal 232A of the ground shift compensation circuitry 212, which supplies the compensated supply voltage. The second supply terminal of the D-S converter circuitry 276 is coupled to the compensated ground terminal 232B of the ground shift compensation circuitry 212, which supplies the compensated ground voltage.

The S-D converter circuitry 280 has an input terminal, a first output terminal, a second output terminal, a first supply terminal, and a second supply terminal. The input terminal of the S-D converter circuitry 280 is coupled to the receiver circuitry 284. The first and second output terminals of the S-D converter circuitry 280 are coupled to the D-S converter circuitry 276. The first supply terminal of the S-D converter circuitry 280 is coupled to the LDO regulator circuitry 208, which supplies the local supply voltage. The second supply terminal of the S-D converter circuitry 280 is coupled to the terminal 200E of the signal conditioning circuitry 200, which supplies the local ground voltage.

The receiver circuitry 284 has an input terminal, an output terminal, a first supply terminal, and a second supply terminal. The input terminal of the receiver circuitry 284 is coupled to the signal logic circuitry 224. The output terminal of the receiver circuitry 284 is coupled to the S-D converter circuitry 280. The first supply terminal of the receiver circuitry 284 is coupled to the LDO regulator circuitry 208, which supplies the local supply voltage. The second supply terminal of the receiver circuitry 284 is coupled to the terminal 200E of the signal conditioning circuitry 200, which supplies the local ground voltage. In some examples, the receiver circuitry 284 is referred to as amplifier circuitry.

The receiver circuitry 286 has a first input terminal, a second input terminal, an output terminal, a first supply terminal, and a second supply terminal. The first input terminal of the receiver circuitry 286 is coupled to the terminal 200A of the signal conditioning circuitry 200, the transmitter circuitry 272, and the receiver circuitry 256. The second input terminal of the receiver circuitry 286 is coupled to the terminal 200B of the signal conditioning circuitry 200, the receiver circuitry 240, and the transmitter circuitry 272. The output terminal of the receiver circuitry 286 is coupled to the S-D converter circuitry 290. The first supply terminal of the receiver circuitry 286 is coupled to the compensated supply terminal 232A of the ground shift compensation circuitry 212, which supplies the compensated supply voltage. The second supply terminal of the receiver circuitry 286 is coupled to the compensated ground terminal 232B of the ground shift compensation circuitry 212, which supplies the compensated ground voltage. In some examples, the receiver circuitry 286 is referred to as amplifier circuitry.

The S-D converter circuitry 290 has an input terminal, a first output terminal, a second output terminal, a first supply terminal, and a second supply terminal. The input terminal of the S-D converter circuitry 290 is coupled to the receiver circuitry 286. The first and second output terminals of the S-D converter circuitry 290 are coupled to the D-S converter circuitry 294. The first supply terminal of the S-D converter circuitry 290 is coupled to the compensated supply terminal 232A of the ground shift compensation circuitry 212, which supplies the compensated supply voltage. The second supply terminal of the S-D converter circuitry 290 is coupled to the compensated ground terminal 232B of the ground shift compensation circuitry 212, which supplies the compensated ground voltage.

The D-S converter circuitry 294 has a first input terminal, a second input terminal, an output terminal, a first supply terminal, and a second supply terminal. The first and second input terminals of the D-S converter circuitry 294 are coupled to the S-D converter circuitry 290. The output terminal of the D-S converter circuitry 294 is coupled to the transmitter circuitry 298. The first supply terminal of the D-S converter circuitry 294 is coupled to the LDO regulator circuitry 208, which supplies the local supply voltage. The second supply terminal of the D-S converter circuitry 294 is coupled to the terminal 200E of the signal conditioning circuitry 200, which supplies the local ground voltage.

In some examples, the data communication circuitry 220 includes an isolation transformer between the S-D converter circuitry 244, 260, 280, 290 and the D-S converter circuitry 248, 264, 276, 294. In such examples, the isolation transformer digitally isolates voltages of the S-D converter circuitry 244, 260, 290 from the voltages of the D-S converter circuitry 248, 264, 294. Alternatively, the data communication circuitry 220 may be modified to implement another type of isolation between the S-D converter circuitry 244, 260, 280, 290 and the D-S converter circuitry 248, 264, 276, 294. For example, the data communication circuitry 220 implements capacitive isolation, galvanic isolation, inductive isolation, or optical isolation.

The transmitter circuitry 298 has an input terminal, an output terminal, a first supply terminal, and a second supply terminal. The input terminal of the transmitter circuitry 298 is coupled to the D-S converter circuitry 294. The output terminal of the transmitter circuitry 298 is coupled to the signal logic circuitry 224. The first supply terminal of the transmitter circuitry 298 is coupled to the LDO regulator circuitry 208, which supplies the local supply voltage. The second supply terminal of the transmitter circuitry 298 is coupled to the terminal 200E of the signal conditioning circuitry 200, which supplies the local ground voltage. In some examples, the transmitter circuitry 298 is referred to as amplifier circuitry.

In example operation, the sense resistor 216 generates a voltage difference responsive to ground currents along the ground of a bus connection. The amplifier circuitry 236 generates a control voltage responsive to the voltage difference across the sense resistor 216. The voltage compensation circuitry 232 generates compensated supply and ground voltages based on the control voltage from the amplifier circuitry 236. Advantageously, the compensated supply and ground voltages represent an approximation of local supply and ground voltages of a device coupled to the terminals 200A, 200B of the signal conditioning circuitry 200.

In such example operations, the receiver circuitry 240, 256, 286 use the compensated supply and ground voltages to detect and receive data at the terminals 200A, 200B of the signal conditioning circuitry 200. The receiver circuitry 240, 256, 286 supply the received data to the S-D converter circuitry 244, 260, 290, which generates differential pairs of signals that represent the received data. The D-S converter circuitry 248, 264, 294 converts the differential pairs of signals to single ended signals that represent the received data in relation to the local supply voltage and the local ground voltage. The transmitter circuitry 252, 268, 298 supply the converted data to the signal logic circuitry 224, which performs signal conditioning operations, such as level shifting, repeating, isolation, multiplexing, etc. Similarly, the receiver circuitry 284 receives data from the signal logic circuitry 224 for transmission to the device coupled to the terminals 200A, 200B of the signal conditioning circuitry 200. The D-S converter circuitry 276 and the S-D converter circuitry 280 converts the received data to a single ended signal that is in relation to the compensated supply and ground voltages. The transmitter circuitry 272 transmits the data using the compensated supply and ground voltages. The data communication circuitry 228 exchanges data between the signal logic circuitry 224 and a device coupled to the terminals 200C, 200D of the signal conditioning circuitry 200. Further example operations of the signal conditioning circuitry 200 are illustrated and described in connection with FIG. 4, below.

Figure 3:
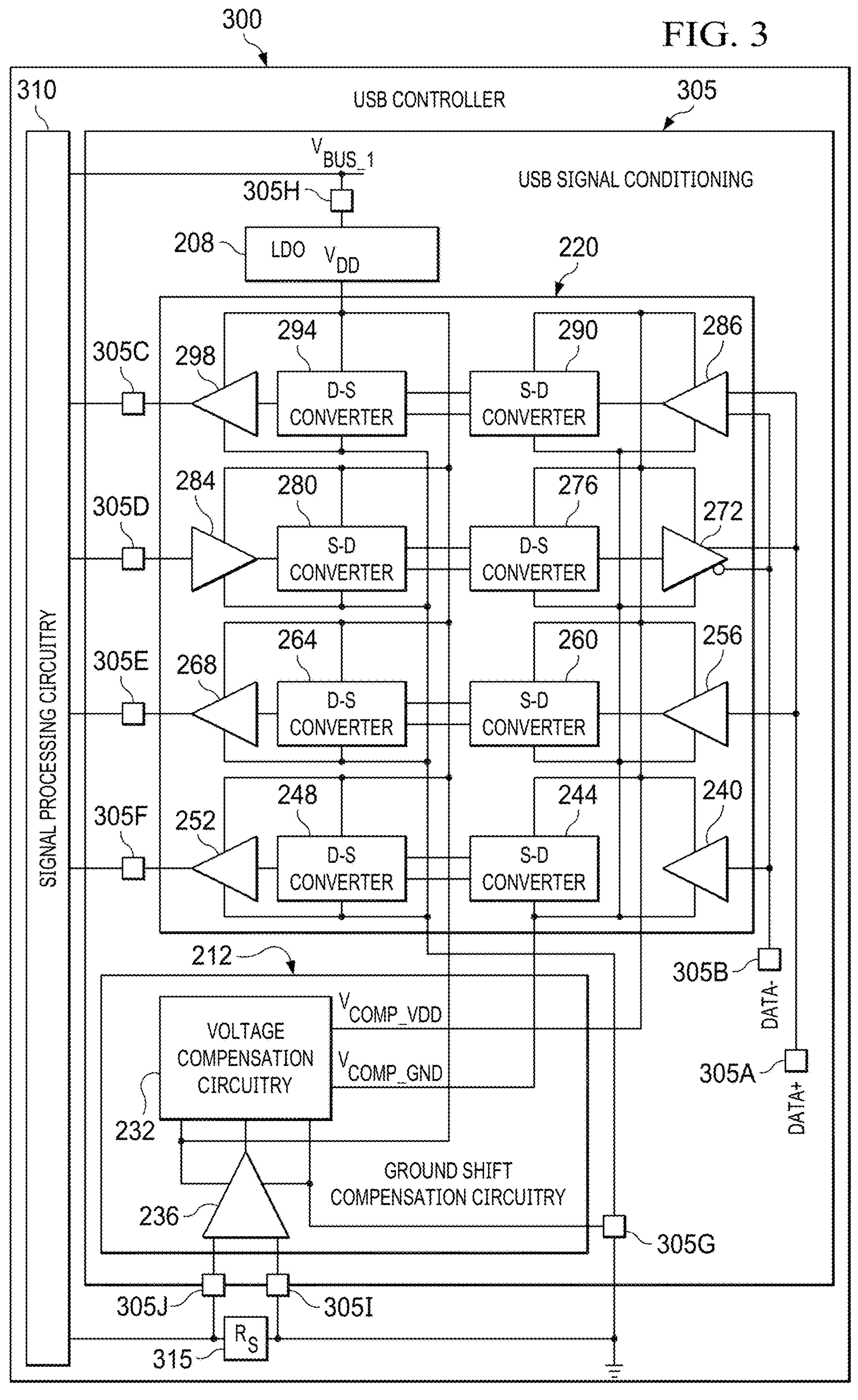
FIG. 3 is a schematic diagram of an example device including another example of the signal conditioning circuitry of FIGS. 1 and 2 and the ground shift compensation circuitry of FIGS. 1 and 2.

FIG. 3 is a schematic diagram of an example device 300, which is an example of the devices 110, 130 of FIG. 1. In the example of FIG. 3, the device 300 includes signal conditioning circuitry 305, signal processing circuitry 310, and a sense resistance 315. The example signal conditioning circuitry 305 of FIG. 3 includes the LDO regulator circuitry 208 of FIG. 2, the ground shift compensation circuitry 212 of FIG. 2, and the data communication circuitry 220 of FIG. 2. The example ground shift compensation circuitry 212 of FIG. 3 includes the voltage compensation circuitry 232 of FIG. 2 and the amplifier circuitry 236 of FIG. 2. The example data communication circuitry 220 of FIG. 3 includes the receiver circuitry 240, 256, 284, 286 of FIG. 2, the S-D converter circuitry 244, 260, 280, 290 of FIG. 2, the D-S converter circuitry 248, 264, 276, 294 of FIG. 2, and the transmitter circuitry 252, 268, 272, 298 of FIG. 2. The device 300 illustrates an example of implementing the ground shift compensation circuitry 170, 212 in a device package.

The signal conditioning circuitry 305 has a first terminal 305A, a second terminal 305B, a third terminal 305C, a fourth terminal 305D, a fifth terminal 305E, a sixth terminal 305F, a seventh terminal 305G, an eighth terminal 305H, a ninth terminal 305I, and a tenth terminal 305J. The terminals 305A, 305B of the signal conditioning circuitry 305 are structured to be coupled to a downstream device, such as one of the devices 110, 130. The terminals 305C, 305D, 305E, 305F of the signal conditioning circuitry 305 are coupled to the signal processing circuitry 310. The terminal 305G of the signal conditioning circuitry 305 is coupled to a ground terminal of a bus connection between the devices 300, 110, 130 and supplies a local ground voltage. The local ground voltage is a voltage of the ground terminal at the position of the signal conditioning circuitry 305 in a bus connection. The terminal 305H of the signal conditioning circuitry 305 is coupled to a bus supply terminal of a bus connection between the devices 300, 110, 130 and supplies a local bus supply voltage. The local bus supply voltage is a voltage of the bus supply terminal at the position of the signal conditioning circuitry 305 in a bus connection. The terminals 305I, 305J of the signal conditioning circuitry 305 are coupled along a ground connection of the bus connection and are structured to be coupled across the sense resistance 315.

The signal processing circuitry 310 has a first terminal, a second terminal, a third terminal, a fourth terminal, a fifth terminal, and a sixth terminal. The first terminal of the signal processing circuitry 310 is coupled to the terminal 305C of the signal conditioning circuitry 305. The second terminal of the signal processing circuitry 310 is coupled to the terminal 305D of the signal conditioning circuitry 305. The third terminal of the signal processing circuitry 310 is coupled to the terminal 305E of the signal conditioning circuitry 305. The fourth terminal of the signal processing circuitry 310 is coupled to the terminal 305F of the signal conditioning circuitry 305. The fifth terminal of the signal processing circuitry 310 is coupled to the terminal 305H of the signal conditioning circuitry 305. The sixth terminal of the signal processing circuitry 310 is coupled to the terminal 305J of the signal conditioning circuitry 305 and the sense resistance 315. The signal processing circuitry 310 is structured to execute instructions that instantiate circuitry to perform operations corresponding to the instruction. In some examples, the signal processing circuitry 310 is referred to as processor circuitry, programmable circuitry, etc. Although in the example of FIG. 3, the signal conditioning circuitry 305 is directly coupled to the signal processing circuitry 310, in other examples, the signal conditioning circuitry 305 may be indirectly coupled to the signal processing circuitry 310.

The sense resistance 315 has a first terminal and a second terminal. The first terminal of the sense resistance 315 is coupled to the terminal 305I of the signal conditioning circuitry 305. The second terminal of the sense resistance 315 is coupled to the terminal 305J of the signal conditioning circuitry 305 and the signal processing circuitry 310. The sense resistance 315 is an example of the sense resistances 140, 216 of FIGS. 1 and 2.

In example operations, the ground shift compensation circuitry 212 compensates the data communication circuitry 220 for ground current between the device 300 and the device coupled to the terminals 305A, 305B of the signal conditioning circuitry 305. In such example operations, the data communication circuitry 220 uses the compensated supply and ground voltages to receive from and transmit data to the device coupled to the terminals 305A, 305B. The data communication circuitry 220 converts data from the logic of the compensated supply and ground voltages to logic levels of the local supply and ground voltages. The signal conditioning circuitry 305 allows the signal processing circuitry 310 to exchange data with a device coupled to the terminals 305A, 305B of the signal conditioning circuitry 305. Further example operations of the signal conditioning circuitry 305 are illustrated and described in connection with FIG. 4, below.

Figure 4:
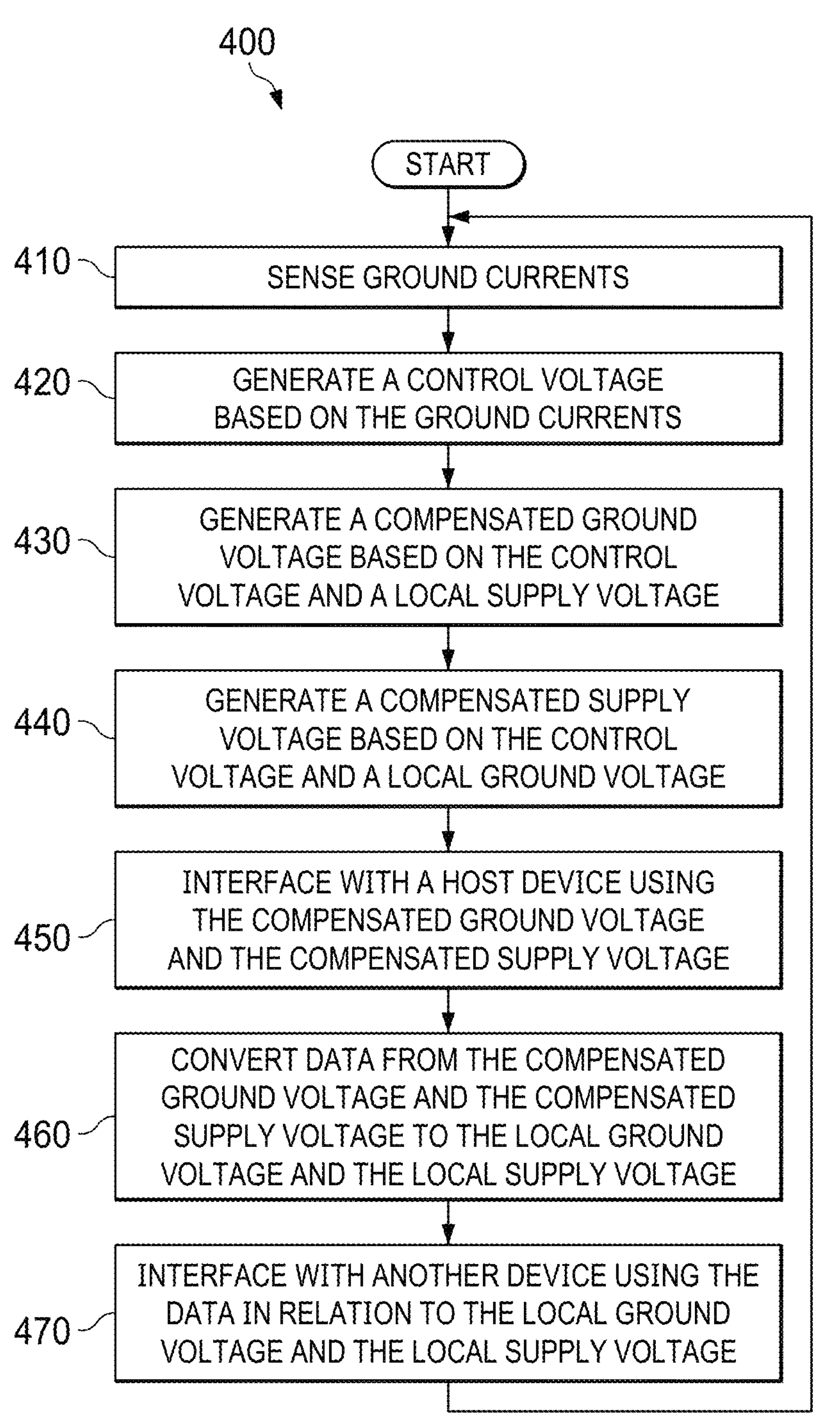
FIG. 4 is a flowchart representative of example operations that may be at least one of executed, instantiated, or performed using an example implementation of the signal conditioning circuitry of FIGS. 1, 2, and 3.

FIG. 4 is a flowchart representative of example operations 400 that may be at least one of executed, instantiated, or performed using an example implementation of the ground shift compensation circuitry 170, 212 of FIGS. 1, 2, and 3, or more generally the signal conditioning circuitry 120, 200, 305 of FIGS. 1, 2, and 3. The example operations 400 of FIG. 4 begin at Block 410, at which the sense resistances 140, 216, 315 of FIGS. 1, 2, and 3 sense ground currents. (Block 410). In some examples, a ground current flowing through the ground of a bus connection generates a voltage difference across the sense resistances 140, 216, 315. In such examples, the voltage difference of the sense resistances 140, 216, 315 is proportional to the magnitude of the ground current.

The amplifier circuitry 236 of FIGS. 2 and 3 generates a control voltage based on the ground currents. (Block 420). In some examples, the amplifier circuitry 236 generates a control voltage that represents the voltage difference across the sense resistances 140, 216, 315. In such examples, the control voltage is proportional to the ground currents.

The voltage compensation circuitry 232 of FIGS. 2 and 3 generates a compensated ground voltage based on the control voltage and a local supply voltage. (Block 430). In some examples, the voltage compensation circuitry 232 generates the compensated ground voltage by adjusting the local supply voltage from the LDO regulator circuitry 208 of FIG. 2 based on the control voltage from the amplifier circuitry 236. The example operations of the voltage compensation circuitry 232 are further illustrated and described in connection with FIGS. 5, 6, and 7 below.

The voltage compensation circuitry 232 generates a compensated supply voltage based on the control voltage and a local ground voltage. (Block 440). In some examples, the voltage compensation circuitry 232 generates the compensated supply voltage by adjusting the local ground voltage from the terminals 200E, 305G of the signal conditioning circuitry 200, 305 based on the control voltage from the amplifier circuitry 236. The example operations of the voltage compensation circuitry 232 are further illustrated and described in connection with FIGS. 5, 6, and 7 below.

The data communication circuitry 220 of FIGS. 2 and 3 interfaces with a host device using the compensated ground voltage and the compensated supply voltage. (Block 450). In some examples, the data communication circuitry 220 exchanges data across the bus connection using the compensated supply voltage and the compensated ground voltage to transmit and receive data. For example, the receiver circuitry 240, 256, 286 of FIGS. 2 and 3 sample the terminals 200A, 200B of the signal conditioning circuitry 200, 305 using compensated logic levels, which are determined by the compensated supply and ground voltages from the ground shift compensation circuitry 212. In such an example, the transmitter circuitry 272 of FIGS. 2 and 3 sets the terminals 200A, 200B of the signal conditioning circuitry 200, 305 using the compensated logic levels. Advantageously, the signal conditioning circuitry 200, 305 increases a likelihood of successful data exchanges by compensating signals of a bus connection for a ground shift.

The data communication circuitry 220 converts data from the compensated ground voltage and the compensated supply voltage to the local ground voltage and the local supply voltage. (Block 460). In some examples, the data communication circuitry 220 converts data received using the compensated logic levels from a single ended signal to a differential pair of signals. The logical value of the differential pair of signals is determined based on the difference between the differential pair of signals. In such examples, the data communication circuitry 220 converts the differential pair of signals to a single ended signal that is in relation to the local ground and the local supply voltage from the LDO regulator circuitry 208. For example, the S-D converter circuitry 244, 260, 290 of FIGS. 2 and 3 generate differential pairs of signals from single ended signals, which are in reference to the compensated supply and ground voltages. In such examples, the D-S converter circuitry 248, 264, 294 of FIGS. 2 and 3 convert the differential pairs of signals to single ended signals that are in reference to the local supply and ground voltages of the signal conditioning circuitry 200, 305. Advantageously, the data communication circuitry 220 corrects signals of the bus connection by converting to and from differential pairs of signals.

The data communication circuitry 220 interfaces with another device using the data in relation to the local ground voltage and the local supply voltage. (Block 470). In some examples, the data communication circuitry 220 supplies the single ended signals, which are in reference to the local supply and ground voltages of the signal conditioning circuitry 200, 305, to another device. For example, in FIG. 2, the data communication circuitry 220 supplies the corrected signals to the signal logic circuitry 224 of FIG. 2 for signal conditioning before the data communication circuitry 228 of FIG. 2 supplies the signals to the device 130. In another example, such as in FIG. 3, the data communication circuitry 220 supplies the corrected signals to the signal processing circuitry 310 of FIG. 3 for signal processing. Advantageously, the ground shift compensation circuitry 212 and the data communication circuitry 220 allows downstream and upstream circuitry to use local supply and ground voltages to exchange data using the bus connection.

Although example methods are described with reference to the flowchart illustrated in FIG. 4, many other methods of implementing the ground shift compensation circuitry 170, 212 of FIGS. 1, 2, and 3, or more generally the signal conditioning circuitry 120, 200, 305 of FIGS. 1, 2, and 3 may also be used in this description. For example, the order of execution of the blocks may be changed, or some of the blocks described may be changed, eliminated, or combined. Similarly, additional operations may be included in the manufacturing process before, in between, or after the blocks shown in the illustrated examples.

Figure 5:
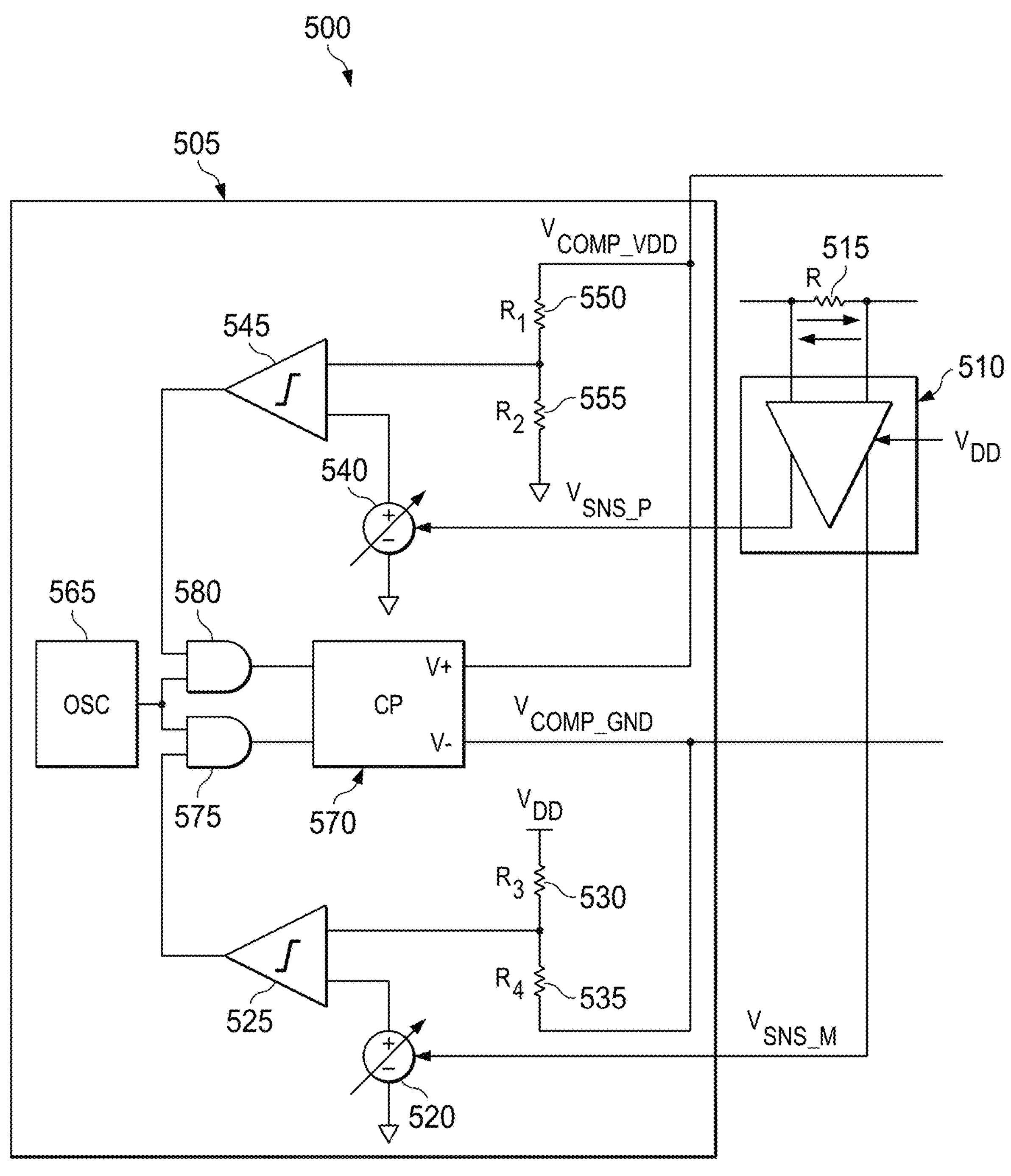
FIG. 5 is a schematic diagram of another example of the ground shift compensation circuitry of FIGS. 1, 2, and 3 including example charge pump circuitry.

FIG. 5 is a schematic diagram of example ground shift compensation circuitry 500, which is an example of the ground shift compensation circuitry 170, 212 of FIGS. 1, 2, and 3. In the example of FIG. 5, the ground shift compensation circuitry 500 includes voltage compensation circuitry 505, amplifier circuitry 510, and a first resistor 515. The example voltage compensation circuitry 505 of FIG. 5 includes first example voltage source circuitry 520, first example comparator circuitry 525, a second example resistor 530, a third example resistor 535, second example voltage source circuitry 540, second example comparator circuitry 545, a fourth example resistor 550, a fifth example resistor 555, example oscillator circuitry 565, example charge pump circuitry 570, a first example logic device 575, and a second example logic device 580.

The ground shift compensation circuitry 500 has a first input terminal, a second input terminal, a first output terminal, a second output terminal, a first supply terminal, and a second supply terminal. The first input terminal of the ground shift compensation circuitry 500 is coupled to the amplifier circuitry 510, the resistor 515, and a first ground terminal of a bus connection, which supplies a first ground voltage. The second input terminal of the ground shift compensation circuitry 500 is coupled to the amplifier circuitry 510, the resistor 515, and a second ground terminal of the bus connection, which supplies a second ground voltage. The first output terminal of the ground shift compensation circuitry 500 supplies the compensated ground voltage ($V_{COMP\_GND}$). The second output terminal of the ground shift compensation circuitry 500 supplies the compensated supply voltage ($V_{COMP\_VDD}$). The first supply terminal of the ground shift compensation circuitry 500 is coupled to the LDO regulator circuitry 208 of FIGS. 2 and 3, which supplies the local supply voltage ($V_{DD}$). The second supply terminal of the ground shift compensation circuitry 500 is coupled to the terminals 200E, 305G of the signal conditioning circuitry 200, 305, which supplies the local ground voltage.

The voltage compensation circuitry 505 has a first input terminal, a second input terminal, a first output terminal, a second output terminal, a first supply terminal, and a second supply terminal. The first and second input terminals are coupled to the amplifier circuitry 510, which supplies a p-side and m-side sense voltage (VSNS P, VSNS M). The p-side and m-side sense voltages are control voltages that represent a ground current through the resistor 515. The first output terminal of the voltage compensation circuitry 505 supplies the compensated ground voltage. The second output terminal of the voltage compensation circuitry 505 supplies the compensated supply voltage. The first supply terminal of the voltage compensation circuitry 505 is coupled to the LDO regulator circuitry 208, which supplies the local supply voltage. The second supply terminal of the voltage compensation circuitry 505 is coupled to the terminals 200E, 305G of the signal conditioning circuitry 200, 305, which supplies the local ground voltage. The voltage compensation circuitry 232 is another example of the voltage compensation circuitry 232 of FIGS. 2 and 3.

The amplifier circuitry 510 has a first input terminal, a second input terminal, a first output terminal, a second output terminal, and a supply terminal. The first input terminal of the amplifier circuitry 510 is coupled to the resistor 515 and the first ground terminal of the bus connection, which supplies the first ground voltage. The second input terminal of the amplifier circuitry 510 is coupled to the resistor 515 and the second ground terminal of the bus connection, which supplies the second ground voltage. The first and second output terminals of the amplifier circuitry 510 are coupled to the voltage compensation circuitry 505. The supply terminal of the amplifier circuitry 510 is coupled to the LDO regulator circuitry 208, which supplies the local supply voltage. In some examples, the supply terminal of the amplifier circuitry 510 is coupled to other voltage regulator circuitry structured to supply a reference voltage that is different from the supply voltage. The amplifier circuitry 510 is another example of the amplifier circuitry 236 of FIGS. 2 and 3.

The resistor 515 has a first terminal and a second terminal. The first terminal of the resistor 515 is coupled to the amplifier circuitry 510 and the first ground terminal of the bus connection, which supplies the first ground voltage. The second terminal of the resistor 515 is coupled to the amplifier circuitry 510 and the second ground terminal of the bus connection, which supplies the second ground voltage. In the example of FIG. 5, the ground current between the first and second ground terminals is approximately equal to the difference between the first and second ground voltages divided by the resistance of the resistor 515.

The voltage source circuitry 520 has a first terminal, a second terminal, and a control terminal. The first terminal of the voltage source circuitry 520 is coupled to the comparator circuitry 525. The second terminal of the voltage source circuitry 520 is coupled to the ground terminal, which provides the local ground voltage. The control terminal of the voltage source circuitry 520 is coupled to the amplifier circuitry 510, which supplies the m-side sense voltage. In the example of FIG. 5, the voltage source circuitry 520 is a voltage-controlled source.

The comparator circuitry 525 has a first input terminal, a second input terminal, and an output terminal. The first input terminal of the comparator circuitry 525 is coupled to the voltage source circuitry 520. The second input terminal of the comparator circuitry 525 is coupled to the resistors 530, 535. The output terminal of the comparator circuitry 525 is coupled to the logic device 575.

The resistor 530 has a first terminal and a second terminal. The first terminal of the resistor 530 is coupled to the LDO regulator circuitry 208, which supplies the local supply voltage. The second terminal of the resistor 530 is coupled to the comparator circuitry 525 and the resistor 535. The resistor 535 has a first terminal and a second terminal. The first terminal of the resistor 535 is coupled to the comparator circuitry 525 and the resistor 530. The second terminal of the resistor 535 is coupled to the charge pump circuitry 570, which supplies the compensated ground voltage. In the example of FIG. 5, the resistors 530, 535 are structured as voltage divider circuitry. Alternatively, the voltage compensation circuitry 505 may be modified to remove or replace the resistors 530, 535 with an alternative type of voltage divider circuitry.

The voltage source circuitry 540 has a first terminal, a second terminal, and a control terminal. The first terminal of the voltage source circuitry 540 is coupled to the comparator circuitry 545. The second terminal of the voltage source circuitry 540 is coupled to the ground terminal, which supplies the local ground voltage. The control terminal of the voltage source circuitry 540 is coupled to the amplifier circuitry 510, which supplies the p-side sense voltage. In the example of FIG. 5, the voltage source circuitry 540 is a voltage-controlled source.

The comparator circuitry 545 has a first input terminal, a second input terminal, and an output terminal. The first input terminal of the comparator circuitry 545 is coupled to the voltage source circuitry 540. The second input terminal of the comparator circuitry 545 is coupled to the resistors 550, 555. The output terminal of the comparator circuitry 545 is coupled to the logic device 580.

The resistor 550 has a first terminal and a second terminal. The first terminal of the resistor 550 is coupled to the charge pump circuitry 570, which supplies the compensated supply voltage. The second terminal of the resistor 550 is coupled to the comparator circuitry 545 and the resistor 555. The resistor 555 has a first terminal and a second terminal. The first terminal of the resistor 555 is coupled to the comparator circuitry 545 and the resistor 550. The second terminal of the resistor 555 is coupled to the ground terminal, which supplies the local ground voltage. In the example of FIG. 5, the resistors 550, 555 are structured as voltage divider circuitry. Alternatively, the voltage compensation circuitry 505 may be modified to remove or replace the resistors 550, 555 with an alternative type of voltage divider circuitry.

The oscillator circuitry 565 has a terminal coupled to the logic devices 575 and 580 and supplies a clock signal. In the example of FIG. 5, the oscillator circuitry 565 is illustrated as internal to the voltage compensation circuitry 505. Alternatively, at least one component of the oscillator circuitry 565 may be external to the voltage compensation circuitry 505. For example, when the oscillator circuitry 565 is a crystal oscillator, a crystal component may be external to the ground shift compensation circuitry 500.

The charge pump circuitry 570 has a first input terminal, a second input terminal, a first output terminal, and a second output terminal. The first input terminal of the charge pump circuitry 570 is coupled to the logic device 575. The second input terminal of the charge pump circuitry 570 is coupled to the logic device 580. The first output terminal of the charge pump circuitry 570 is coupled to the resistor 535 and supplies the compensated ground voltage. The second output terminal of the charge pump circuitry 570 is coupled to the resistor 550 and supplies the compensated supply voltage. An example of the charge pump circuitry 570 is illustrated and described in connection with FIG. 6, below.

The logic device 575 has a first input terminal, a second input terminal, and an output terminal. The first input terminal of the logic device 575 is coupled to the comparator circuitry 525. The second input terminal of the logic device 575 is coupled to the oscillator circuitry 565 and the logic device 580. The output terminal of the logic device 575 is coupled to the charge pump circuitry 570. In the example of FIG. 5, the logic device 575 is an AND gate. Alternatively, the logic device 575 may be replaced with one or more different logic devices.

The logic device 580 has a first input terminal, a second input terminal, and an output terminal. The first input terminal of the logic device 580 is coupled to the comparator circuitry 545. The second input terminal of the logic device 580 is coupled to the oscillator circuitry 565 and the logic device 575. The output terminal of the logic device 580 is coupled to the charge pump circuitry 570. In the example of FIG. 5, the logic device 580 is an AND gate. Alternatively, the logic device 580 may be replaced with one or more different logic devices.

In example operation, the amplifier circuitry 510 senses ground currents responsive to sensing a voltage difference across the resistor 515. The amplifier circuitry 510 generates p-side and m-side sense voltages to represent the voltage difference across the resistor 515. In some examples, the p-side and m-side sense voltages are referred to as control voltages. The voltage source circuitry 520 generates an m-side threshold voltage based on the m-side sense voltage. The voltage source circuitry 540 generates a p-side threshold voltage based on the p-side sense voltage. The resistors 530, 535 generate an m-side floating reference voltage as a voltage between the supply voltage from the LDO regulator circuitry 208 and the compensated ground voltage from the charge pump circuitry 570. The resistors 550, 555 generate a p-side floating reference voltage as a voltage between the local ground voltage and the compensated supply voltage from the charge pump circuitry 570.

In such example operations, the comparator circuitry 525 generates an m-side comparator output responsive to a comparison of the m-side threshold voltage to the m-side floating reference voltage. The comparator circuitry 545 generates a p-side comparator output responsive to a comparison of the p-side threshold voltage to the p-side floating reference voltage. The logic devices 575, 580 synchronize the p-side and m-side comparator outputs to the clock signal from the oscillator circuitry 565. The logic devices 575, 580 supply the synchronized p-side and m-side comparator outputs to the charge pump circuitry 570. The charge pump circuitry 570 adjusts the compensated supply and ground voltage responsive to the synchronized p-side and m-side comparator outputs. Further example operations of the ground shift compensation circuitry 500 are further illustrated and described in connection with FIG. 7, below.

Figure 6:
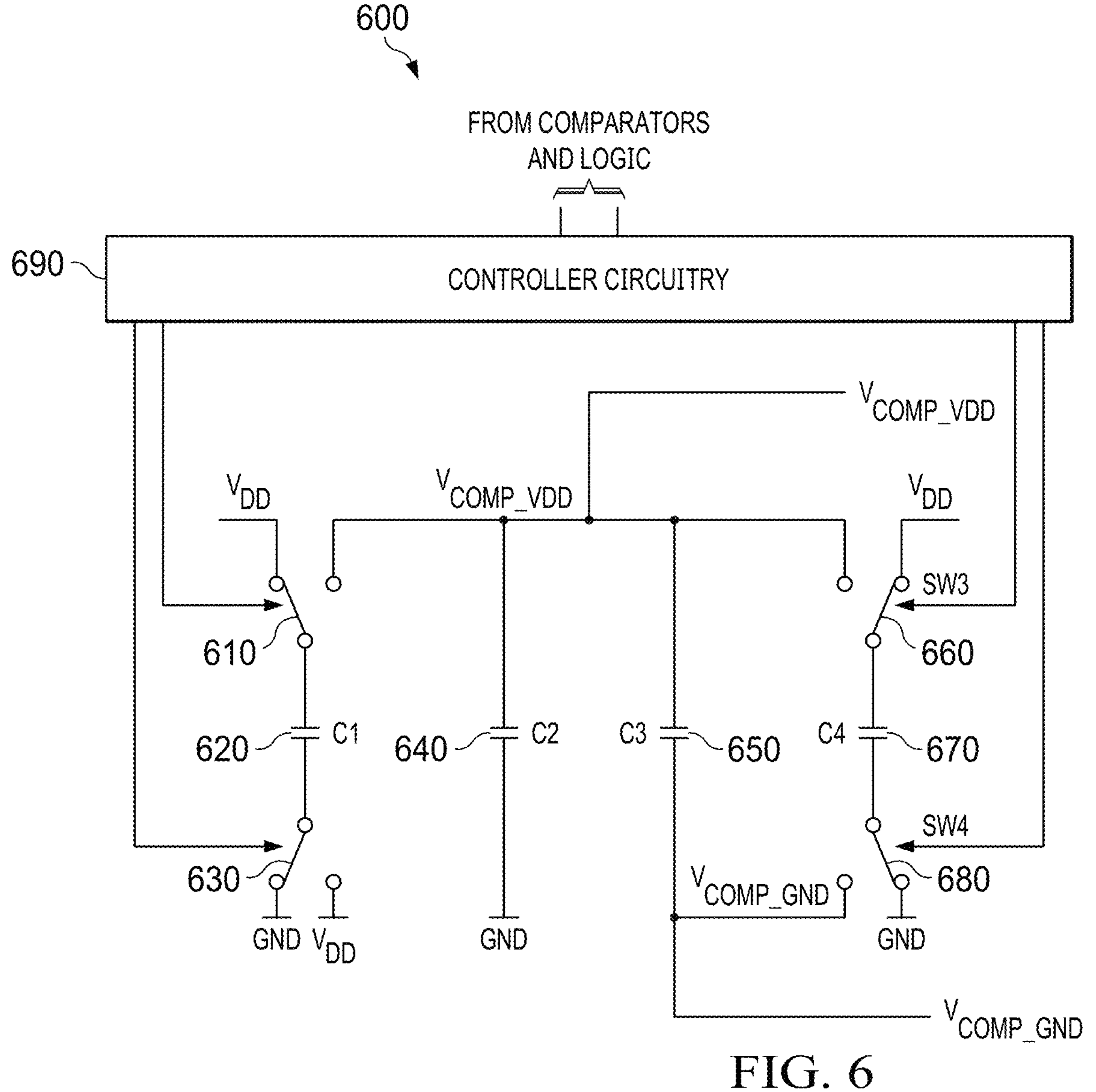
FIG. 6 is a schematic diagram of an example of the charge pump circuitry of FIG. 5.

FIG. 6 is a schematic diagram of example charge pump circuitry 600, which is an example of the charge pump circuitry 570 of FIG. 5. In the example of FIG. 6, the charge pump circuitry 600 includes a first switch 610, a first capacitor 620, a second switch 630, a second capacitor 640, a third capacitor 650, a third switch 660, a fourth capacitor 670, a fourth switch 680, and controller circuitry 690.

The charge pump circuitry 600 has a first input terminal, a second input terminal, a first output terminal, a second output terminal, a first supply terminal, and a second supply terminal. The first input terminal of the charge pump circuitry 600 is coupled to the logic device 575 of FIG. 5. The second input terminal of the charge pump circuitry 600 is coupled to the logic device 580 of FIG. 5. The first output terminal of the charge pump circuitry 600 supplies the compensated ground voltage. The second output terminal of the charge pump circuitry 600 supplies the compensated supply voltage. The first supply terminal of the charge pump circuitry 600 is coupled to the LDO regulator circuitry 208 of FIGS. 2 and 3, which supplies the local supply voltage. The second supply terminal of the charge pump circuitry 600 is coupled to the terminals 200E, 305G of the signal conditioning circuitry 200, 305 of FIGS. 2 and 3, which supplies the local ground voltage.

The switch 610 has a first terminal, a second terminal, a third terminal, and a control terminal. The first terminal of the switch 610 is coupled to the switches 660, 630 and the first supply terminal of the charge pump circuitry 600, which supplies the local supply voltage. The second terminal of the switch 610 is coupled to the capacitors 640, 650, the switch 660, and the second output terminal of the charge pump circuitry 600, which supplies the compensated supply voltage. The third terminal of the switch 610 is coupled to the capacitor 620. The control terminal of the switch 610 is coupled to the controller circuitry 690. In the example of FIG. 6, the switch 610 is a toggle switch, which couples the capacitor 620 to one of the supply voltage or the compensated supply voltage. Alternatively, the charge pump circuitry 600 may be modified to remove or replace the switch 610 with alternative switching circuitry.

The capacitor 620 has a first terminal and a second terminal. The first terminal of the capacitor 620 is coupled to the switch 610. The second terminal of the capacitor 620 is coupled to the switch 630.

The switch 630 has a first terminal, a second terminal, a third terminal, and a control terminal. The first terminal of the switch 630 is coupled to the capacitor 640, the switch 680, and the second supply terminal of the charge pump circuitry 600, which supplies the local ground voltage. The second terminal of the switch 630 is coupled to the switches 610, 660 and the first supply terminal of the charge pump circuitry 600, which supplies the local supply voltage. The third terminal of the switch 630 is coupled to the capacitor 620. In the example of FIG. 6, the switch 630 is a toggle switch, which couples the capacitor 620 to one of the supply voltage or the local ground voltage. Alternatively, the charge pump circuitry 600 may be modified to remove or replace the switch 630 with alternative switching circuitry.

The capacitor 640 has a first terminal and a second terminal. The first terminal of the capacitor 640 is coupled to switches 610, 660, the capacitor 650, and the second output terminal of the charge pump circuitry 600, which supplies the compensated supply voltage. The second terminal of the capacitor 640 is coupled to the switches 630, 680 and the second supply terminal of the charge pump circuitry 600, which supplies the local ground voltage.

The capacitor 650 has a first terminal and a second terminal. The first terminal of the capacitor 650 is coupled to the switches 610, 660, the capacitor 640, and the second output terminal of the charge pump circuitry 600. The second terminal of the capacitor 650 is coupled to the switch 680 and the first output terminal of the charge pump circuitry 600, which supplies the compensated ground voltage.

The switch 660 has a first terminal, a second terminal, a third terminal, and a control terminal. The first terminal of the switch 660 is coupled to the switch 610, the capacitors 640, 650, and the second output terminal of the charge pump circuitry 600, which supplies the compensated supply voltage. The second terminal of the switch 660 is coupled to the switches 610, 630 and the first supply terminal of the charge pump circuitry 600, which supplies the local supply voltage. The third terminal of the switch 660 is coupled to the capacitor 670. The control terminal of the switch 660 is coupled to the controller circuitry 690.

The capacitor 670 has a first terminal and a second terminal. The first terminal of the capacitor 670 is coupled to the switch 660. The second terminal of the capacitor 670 is coupled to the switch 680.

The switch 680 has a first terminal, a second terminal, a third terminal, and a control terminal. The first terminal of the switch 680 is coupled to the capacitor 650 and the first output terminal of the charge pump circuitry 600, which supplies the compensated ground voltage. The second terminal of the switch 680 is coupled to the switch 630, the capacitor 640, and the second supply terminal of the charge pump circuitry 600, which supplies the local ground voltage. The third terminal of the switch 680 is coupled to the capacitor 670. The control terminal of the switch 680 is coupled to the controller circuitry 690. In the example of FIG. 6, the switches 610, 630, 660, 680 are illustrated and described as switches. However, in some examples, the switches 610, 630, 660, 680 may be implemented using one or more components, such as transistors structured as switch circuitry.

The controller circuitry 690 has a first input terminal, a second input terminal, a first output terminal, a second output terminal, a third output terminal, and a fourth output terminal. The first input terminal of the controller circuitry 690 is coupled to the first input terminal of the charge pump circuitry 600, which supplies the m-side synchronized comparator output. The second input terminal of the controller circuitry 690 is coupled to the second input terminal of the charge pump circuitry 600, which supplies the p-side synchronized comparator output. The first output terminal of the controller circuitry 690 is coupled to the switch 610. The second output terminal of the controller circuitry 690 is coupled to the switch 630. The third output terminal of the controller circuitry 690 is coupled to the switch 660. The fourth output terminal of the controller circuitry 690 is coupled to the switch 680. In the example of FIG. 6, the controller circuitry 690 is structured to control the switches 610, 630, 660, 680. In some examples, the controller circuitry 690 is implemented using a series of logic devices, a finite state machine, or alternative circuitry.

In example operation, the controller circuitry 690 receives the p-side and m-side synchronized comparator outputs, which represent a comparison of the compensated supply and ground voltages to the threshold voltages of the voltage source circuitry 520, 540 of FIG. 5. When the p-side and m-side synchronized comparator outputs represent that the compensated supply and ground voltages are less than the threshold voltages (e.g., the compensated supply and ground voltages need to be increased), the controller circuitry 690 switches the switches 610, 630 to the right. In such examples, the voltage across the capacitor 620 is approximately equal to the supply voltage, which boosts the compensated supply voltage to be approximately equal to two times the supply voltage divided by the capacitance of the capacitor 640. Advantageously, the charge pump circuitry 600 may set the compensated supply voltage to a voltage greater than the supply voltage.

When the p-side and m-side synchronized comparator outputs represent that the compensated supply and ground voltages are greater than the threshold voltages (e.g., the compensated supply and ground voltages need to be decreased), the controller circuitry 690 switches the switch 610 to the right and switch 630 to the left. In such examples, the voltage across the capacitor 620 is approximately equal to the supply voltage, which sets the compensated supply voltage to be approximately equal to the supply voltage divided by the capacitance of the capacitor 640. Advantageously, the charge pump circuitry 600 may set the compensated supply voltage to a voltage less than the supply voltage.

In such example operations, when adjusting the switches 610, 630, the controller circuitry 690 switches the switches 660, 680 to the left to set the compensated ground voltage. In such examples, the compensated ground voltage is approximately equal to the compensated supply voltage minus the supply voltage. Further example operations of the charge pump circuitry 600 are further illustrated and described in connection with FIG. 7, below.

Figure 7:
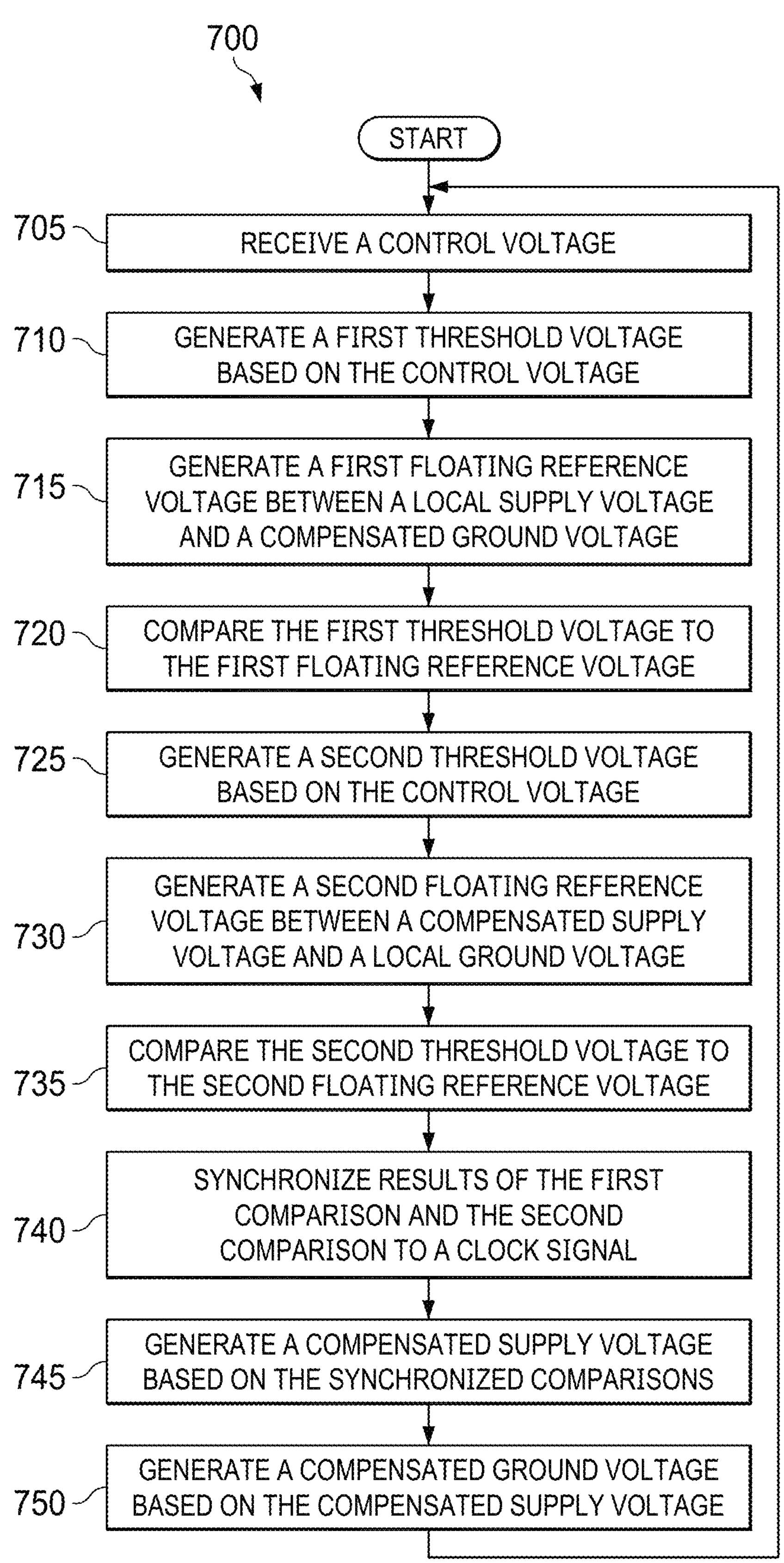
FIG. 7 is a flowchart representative of example operations that may be at least one of executed, instantiated, or performed using an example implementation of the ground shift compensation circuitry of FIGS. 1, 2, 3, and 5.

FIG. 7 is a flowchart representative of example operations 700 that may be at least one of executed, instantiated, or performed using an example implementation of the ground shift compensation circuitry 170, 212, 500 of FIGS. 1, 2, 3, and 5. The example operations 700 begin at Block 710, at which, the voltage compensation circuitry 232, 505 of FIGS. 2 and 5 receive a control voltage. (Block 705). In some examples, the amplifier circuitry 236, 510 of FIGS. 2, 3, and 5 generate a sense voltage (also referred to as a control voltage) responsive to ground currents through the sense resistors 140, 216, 315 of FIGS. 1, 2, 3 or the resistor 515 of FIG. 5. In some such examples, such as in FIG. 5, the amplifier circuitry 510 generates p-side and m-side sense voltages based on the voltage difference across the resistor 515.

The voltage source circuitry 520 of FIG. 5 generates a first threshold voltage based on the control voltage. (Block 710). In some examples, the voltage source circuitry 520 generates an m-side reference voltage responsive to the m-side sense voltage from the amplifier circuitry 510. In such examples, the voltage source circuitry 520 sets the m-side reference voltage to be proportional to the m-side sense voltage.

The resistors 530, 535 of FIG. 5 generate a first floating reference voltage between a local supply voltage and a compensated ground voltage. (Block 715). In some examples, the resistors 530, 535 generate an m-side floating reference voltage by dividing the difference between the supply voltage from the LDO regulator circuitry 208 of FIGS. 2 and 3 and the compensated ground voltage. In such examples, the resistances of the resistors 530, 535 may be modified to calibrate the m-side floating reference voltage.

The comparator circuitry 525 of FIG. 5 compares the first threshold voltage to the first floating reference voltage. (Block 720). In some examples, the comparator circuitry 525 generates an m-side comparator output by comparing the m-side threshold voltage from the voltage source circuitry 520 to the m-side floating reference voltage from the resistors 530, 535.

The voltage source circuitry 540 of FIG. 5 generates a second threshold voltage based on the control voltage. (Block 725). In some examples, the voltage source circuitry 540 generates a p-side reference voltage responsive to the p-side sense voltage from the amplifier circuitry 510. In such examples, the voltage source circuitry 540 sets the p-side reference voltage to be proportional to the p-side sense voltage.

The resistors 550, 555 of FIG. 5 generate a second floating reference voltage between a compensated supply voltage and a local ground voltage. (Block 730). In some examples, the resistors 550, 555 generate a p-side floating reference voltage by dividing the difference between the compensated supply voltage and the local ground voltage. In such examples, the resistances of the resistors 550, 555 may be modified to calibrate the p-side floating reference voltage.

The comparator circuitry 545 compares the second threshold voltage to the second floating reference voltage. (Block 735). In some examples, the comparator circuitry 545 generates a p-side comparator output by comparing the p-side threshold voltage from the voltage source circuitry 540 to the p-side floating reference voltage from the resistors 550, 555.

The logic devices 575, 580 of FIG. 5 combine results of the first comparison and the second comparison with an oscillator signal. (Block 740). In some examples, the logic device 575 generates an m-side synchronized comparator output by synchronizing the m-side comparator output to a clock signal from the oscillator circuitry 565 of FIG. 5. In such examples, the logic device 580 generates a p-side synchronized comparator output by synchronizing the p-side comparator output to the clock signal from the oscillator circuitry 565. Advantageously, the oscillator circuitry 565 and the logic device 575, 580 increase the stability of the charge pump circuitry 570.

The charge pump circuitry 570, 600 of FIGS. 5 and 6 generates a compensated supply voltage based on the synchronized comparisons. (Block 745). In some examples, the charge pump circuitry 570, 600 switches the switches 610, 630 of FIG. 6 to the left and the switches 660, 680 of FIG. 6 to the right during a charge phase. In such examples, the switches 610, 630, 660, 680 charge the capacitors 620, 670 to the local supply voltage from the LDO regulator circuitry 208. After the charge phase, the controller circuitry 690 of FIG. 6 begins a voltage generation phase by adjusting the states of the switches 610, 630, 660, 680 based on the synchronized p-side and m-side comparator outputs.

In such examples, when the synchronized p-side and m-side comparator outputs indicate that both the compensated supply and ground voltage are less than the p-side and m-side threshold voltages, the controller circuitry 690 determines to increase both the compensated supply and ground voltages. The controller circuitry 690 switches both the switches 610, 630 to the right, which sets the compensated supply voltage to two times the supply voltage divided by the capacitance of the capacitor 640. When the synchronized p-side and m-side comparator outputs indicate that both the compensated supply and ground voltage are greater than the p-side and m-side threshold voltages, the controller circuitry 690 determines to decrease both the compensated supply and ground voltages. The controller circuitry 690 switches the switch 610 to the right and keeps the switch 630 to the right, which sets the compensated supply voltage to the supply voltage divided by the capacitance of the capacitor 640. In such example operations, the charge phase and the voltage generation phase occur periodically based on a switching speed of the charge pump circuitry 570, 600.

The charge pump circuitry 570, 600 generates a compensated ground voltage based on the compensated supply voltage. (Block 750). In some examples, during the voltage generation phase of the charge pump circuitry 570, 600, the controller circuitry 690 switches the switches 660, 680 to the left. When switched to the left, the switches 660, 680 set the compensated ground voltage to be approximately equal to the compensated supply voltage minus the local supply voltage from the LDO regulator circuitry 208.

Advantageously, the ground shift compensation circuitry 170, 212, 500 of FIGS. 1, 2, 3, and 5 generate the compensated supply and ground voltages based on ground currents through the sense resistors 140, 216, 315 or the resistor 515. Advantageously, compensating the data communication circuitry 220 for the ground currents of the bus connection increases a likelihood of successfully exchanging data between devices.

Although example methods are described with reference to the flowchart illustrated in FIG. 7, many other methods of implementing the ground shift compensation circuitry 170, 212, 500 of FIGS. 1, 2, 3, and 5 may also be used in this description. For example, the order of execution of the blocks may be changed, or some of the blocks described may be changed, eliminated, or combined. Similarly, additional operations may be included in the manufacturing process before, in between, or after the blocks shown in the illustrated examples.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and things, the phrase "at least one of A and B" refers to implementations including any of (1) at least one A, (2) at least one B, or (3) at least one A and at least one B. Similarly, as used herein in the context of describing structures, components, items, objects and things, the phrase "at least one of A or B" refers to implementations including any of (1) at least one A, (2) at least one B, or (3) at least one A and at least one B. As used herein in the context of describing the performance or execution of processes, instructions, actions, activities, etc., the phrase "at least one of A and B" refers to implementations including any of (1) at least one A, (2) at least one B, or (3) at least one A and at least one B. Similarly, as used herein in the context of describing the performance or execution of processes, instructions, actions, activities, etc., the phrase "at least one of A or B" refers to implementations including any of (1) at least one A, (2) at least one B, or (3) at least one A and at least one B.

As used herein, singular references (e.g., "a," "an," "first," "second," etc.) do not exclude a plurality. The term "a" or "an" object, as used herein, refers to one or more of that object. The terms "a" (or "an"), "one or more," and "at least one" are used interchangeably herein. Furthermore, although individually listed, a plurality of means, elements, or actions may be implemented by, e.g., the same entity or object. Also, although individual features may be included in different examples or claims, these may possibly be combined, and the inclusion in different examples or claims does not imply that a combination of features is at least one of not feasible or advantageous.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by at least one of the connection reference or relative movement between those elements unless otherwise indicated. As such, connection references do not necessarily infer that two elements are directly connected or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, or ordering in any way, but are merely used as at least one of labels or arbitrary names to distinguish elements for ease of understanding the described examples. In some examples, the descriptor "first" may be used to refer to an element in the detailed description, while the same element may be referred to in a claim with a different descriptor such as "second" or "third." In such instances, such descriptors are used merely for identifying those elements distinctly within the context of the discussion (e.g., within a claim) in which the elements might, for example, otherwise share a same name.

As used herein, "approximately" and "about" modify their subjects/values to recognize the potential presence of variations that occur in real world applications. For example, "approximately" and "about" may modify dimensions that may not be exact due to at least one of manufacturing tolerances or other real-world imperfections. For example, "approximately" and "about" may indicate such dimensions may be within a tolerance range of +/−10% unless otherwise specified herein.

As used herein "substantially real time" refers to occurrence in a near instantaneous manner recognizing there may be real world delays for computing time, transmission, etc. Thus, unless otherwise specified, "substantially real time" refers to real time+1 second.

As used herein, the phrase "in communication," including variations thereof, encompasses one of or a combination of direct communication or indirect communication through one or more intermediary components, and does not require direct physical (e.g., wired) communication or constant communication, but rather also includes selective communication at least one of periodic intervals, scheduled intervals, aperiodic intervals, or one-time events.

As used herein, "programmable circuitry" is defined to include at least one of (i) one or more special purpose electrical circuits (e.g., an application specific circuit (ASIC)) structured to perform specific operation(s) and including one or more semiconductor-based logic devices (e.g., electrical hardware implemented by one or more transistors), or (ii) one or more general purpose semiconductor-based electrical circuits programmable with instructions to perform one or more specific functions(s) or operation(s) and including one or more semiconductor-based logic devices (e.g., electrical hardware implemented by one or more transistors). Examples of programmable circuitry include programmable microprocessors such as Central Processor Units (CPUs) that may execute first instructions to perform one or more operations or functions, Field Programmable Gate Arrays (FPGAs) that may be programmed with second instructions to at least one of configure or structure the FPGAs to instantiate one or more operations or functions corresponding to the first instructions, Graphics Processor Units (GPUs) that may execute first instructions to perform one or more operations or functions, Digital Signal Processors (DSPs) that may execute first instructions to perform one or more operations or functions, XPUs, Network Processing Units (NPUs) one or more microcontrollers that may execute first instructions to perform one or more operations or functions or integrated circuits such as Application Specific Integrated Circuits (ASICs). For example, an XPU may be implemented by a heterogeneous computing system including multiple types of programmable circuitry (e.g., one or more FPGAs, one or more CPUs, one or more GPUs, one or more NPUs, one or more DSPs, etc., and any combination(s) thereof), and orchestration technology (e.g., application programming interface(s) (API(s)) that may assign computing task(s) to whichever one(s) of the multiple types of programmable circuitry is/are suited and available to perform the computing task(s).

As used herein integrated circuit/circuitry is defined as one or more semiconductor packages containing one or more circuit elements such as transistors, capacitors, inductors, resistors, current paths, diodes, etc. For example, an integrated circuit may be implemented as one or more of an ASIC, an FPGA, a chip, a microchip, programmable circuitry, a semiconductor substrate coupling multiple circuit elements, a system on chip (SoC), etc.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

A device that is "configured to" perform a task or function may be configured (e.g., at least one of programmed or hardwired) at a time of manufacturing by a manufacturer to at least one of perform the function or be configurable (or re-configurable) by a user after manufacturing to perform the function/or other additional or alternative functions. The configuring may be through at least one of firmware or software programming of the device, through at least one of a construction or layout of hardware components and interconnections of the device, or a combination thereof.

As used herein, the terms "terminal," "node," "interconnection," "pin" and "lead" are used interchangeably. Unless specifically stated to the contrary, these terms are generally used to mean an interconnection between or a terminus of a device element, a circuit element, an integrated circuit, a device or other electronics or semiconductor component.

In the description and claims, described "circuitry" may include one or more circuits. A circuit or device that is described herein as including certain components may instead be adapted to be coupled to those components to form the described circuitry or device. For example, a structure described as including one or more semiconductor elements (such as transistors), one or more passive elements (such as one of or a combination of resistors, capacitors, or inductors), or one or more sources (such as voltage and/or current sources) may instead include only the semiconductor elements within a single physical device (e.g., at least one of a semiconductor die or integrated circuit (IC) package) and may be adapted to be coupled to at least some of the passive elements or the sources to form the described structure either at a time of manufacture or after a time of manufacture, for example, by at least one of an end-user or a third-party.

Circuits described herein are reconfigurable to include the replaced components to provide functionality at least partially similar to functionality available prior to the component replacement. Components shown as resistors, unless otherwise stated, are generally representative of any one or more elements coupled in at least one of series or parallel to provide an amount of impedance represented by the shown resistor. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor. While certain elements of the described examples are included in an integrated circuit and other elements are external to the integrated circuit, in other example embodiments, additional or fewer features may be incorporated into the integrated circuit. In addition, some or all of the features illustrated as being external to the integrated circuit may be included in the integrated circuit and some features illustrated as being internal to the integrated circuit may be incorporated outside of the integrated. As used herein, the term "integrated circuit" means one or more circuits that are at least one of: (i) incorporated in/over a semiconductor substrate; (ii) incorporated in a single semiconductor package; (iii) incorporated into the same module; or (iv) incorporated in/on the same printed circuit board.

Uses of the phrase "ground" in the foregoing description include at least one of a chassis ground, an Earth ground, a floating ground, a virtual ground, a digital ground, a common ground, or any other form of ground connection applicable to, or suitable for, the teachings of this description. Unless otherwise stated, "about," "approximately," or "substantially" preceding a value means+/−10 percent of the stated value, or, if the value is zero, a reasonable range of values around zero.

Modifications are possible in the described embodiments, and other embodiments are possible, within the scope of the claims.

What is claimed is:

1. An integrated circuit comprising:

a bus connection including:
- a common terminal;
- a first data terminal; and
- a second data terminal;

an amplifier having an input terminal and an output terminal, the input terminal of the amplifier coupled to the common terminal of the bus connection;

charge pump circuitry having an input terminal, a first output terminal, and a second output terminal, the input terminal of the charge pump circuitry coupled to the output terminal of the amplifier;

receiver circuitry having an input terminal, a first supply terminal, and a second supply terminal, the input terminal of the receiver circuitry coupled to the first data terminal of the bus connection; and transmitter circuitry having an output terminal, a first supply terminal, and a second supply terminal, the output terminal of the transmitter circuitry coupled to the second data terminal of the bus connection, the first supply terminal of the transmitter circuitry coupled to the first output terminal of the charge pump circuitry and the first supply terminal of the receiver circuitry, the second supply terminal of the transmitter circuitry coupled to the second output terminal of the charge pump circuitry and the second supply terminal of the receiver circuitry.

2. The integrated circuit of claim 1, wherein the bus connection further includes a bus supply terminal, the charge pump circuitry further having a second input terminal, and the integrated circuit further comprising low dropout (LDO)

regulator circuitry having a first terminal and a second terminal, the first terminal of the LDO regulator circuitry is coupled to the bus supply terminal of the bus connection, the second terminal of the LDO regulator circuitry is coupled to the second input terminal of the charge pump circuitry.

3. The integrated circuit of claim 2, wherein the transmitter circuitry is first transmitter circuitry, the receiver circuitry further having an output terminal, and the integrated circuit further comprising second transmitter circuitry having an input terminal, a first supply terminal, and a second supply terminal, the input terminal of the second transmitter circuitry is coupled to the output terminal of the receiver circuitry, the first supply terminal of the second transmitter circuitry is coupled to the second terminal of the LDO regulator circuitry, the second supply terminal of the second transmitter circuitry is coupled to the common terminal of the bus connection.

4. The integrated circuit of claim 1, wherein the input terminal of the amplifier is a first input terminal, the amplifier further having a second input terminal, and the integrated circuit further comprising a resistor having a first terminal and a second terminal, the first terminal of the resistor is coupled to the common terminal of the bus connection and the first input terminal of the amplifier, the second terminal of the resistor is coupled to the second input terminal of the amplifier.

5. The integrated circuit of claim 1, further comprising:
- comparator circuitry having a first input terminal, a second input terminal, and an output terminal, the first input terminal of the comparator circuitry is coupled to the output terminal of the amplifier; and
- voltage divider circuitry having a first terminal and a second terminal, the first terminal of the voltage divider circuitry is coupled to the second input terminal of the comparator circuitry, the second terminal of the voltage divider circuitry coupled to the first output terminal of the charge pump circuitry; and
- logic circuitry having an input terminal and an output terminal, the input terminal of the logic circuitry coupled to the output terminal of the comparator circuitry, the output terminal of the logic circuitry coupled to the input terminal of the charge pump circuitry.

6. The integrated circuit of claim 1, wherein the receiver circuitry further has an output terminal, and the integrated circuit further comprising single-ended-to-differential (S-D) converter circuitry having a first terminal, a first supply terminal, and a second supply terminal, the first terminal of the S-D converter circuitry is coupled to the output terminal of the receiver circuitry, the first supply terminal of the S-D converter circuitry is coupled to the first output terminal of the charge pump circuitry, the first supply terminal of the receiver circuitry, and the first supply terminal of the transmitter circuitry, the second supply terminal of the S-D converter circuitry is coupled to the second output terminal of the charge pump circuitry, the second supply terminal of the receiver circuitry, and the second supply terminal of the transmitter circuitry.

7. The integrated circuit of claim 6, wherein the bus connection further has a bus supply terminal, the S-D converter circuitry further has a third terminal and a fourth terminal, and the integrated circuit further comprising differential-to-single-ended (D-S) converter circuitry having a first terminal, a second terminal, a first supply terminal, and a second supply terminal, the first terminal of the D-S converter circuitry is coupled to the second terminal of the S-D converter circuitry, the second terminal of the D-S converter circuitry is coupled to the third terminal of the S-D converter circuitry, the first supply terminal of the D-S converter circuitry is coupled to the bus supply terminal of the bus connection, the second supply terminal of the D-S converter circuitry is coupled to the common terminal of the bus connection.

8. An apparatus comprising:
- a universal serial bus (USB) connection having a common terminal and a data terminal;
- interface circuitry having a data terminal, a common terminal, a first supply input, and a second supply input, the data terminal of the interface circuitry coupled to the data terminal of the USB connection;
- a resistor having a first terminal and a second terminal;
- amplifier circuitry having a first input terminal, a second input terminal, and an output terminal, the first input terminal of the amplifier circuitry coupled to the common terminal of the USB connection and the first terminal of the resistor, the second input terminal of the amplifier circuitry coupled to the common terminal of the interface circuitry and the second terminal of the resistor; and
- voltage compensation circuitry having an input terminal, a first output terminal, and a second output terminal, the input terminal of the voltage compensation circuitry coupled to the output terminal of the amplifier circuitry, the first output terminal of the voltage compensation circuitry coupled to the first supply input of the interface circuitry, the second output terminal of the voltage compensation circuitry coupled to the second supply input of the interface circuitry.

9. The apparatus of claim 8, wherein the USB connection further has a bus supply terminal, the voltage compensation circuitry further has a second input terminal, the interface circuitry further has a third supply terminal, and the apparatus further comprising voltage regulator circuitry having a first terminal and a second terminal, the first terminal of the voltage regulator circuitry is coupled to the bus supply terminal, the second terminal of the voltage regulator circuitry is coupled to the third supply terminal of the interface circuitry and the second input terminal of the voltage compensation circuitry.

10. The apparatus of claim 8, wherein the interface circuitry is one of repeater circuitry, digital isolator circuitry, fanout circuitry, or level shifter circuitry.

11. The apparatus of claim 8, wherein the voltage compensation circuitry includes:
- comparator circuitry having a first input terminal, a second input terminal, and an output terminal, the first input terminal of the comparator circuitry is coupled to the output terminal of the amplifier circuitry;
- a first resistor having a first terminal and a second terminal;
- a second resistor having a first terminal and a second terminal, the first terminal of the second resistor is coupled to the common terminal of the USB connection, the second terminal of the second resistor is coupled to the first terminal of the first resistor; and
- charge pump circuitry having an input terminal and an output terminal, the input terminal of the charge pump circuitry is coupled to the output terminal of the comparator circuitry, the output terminal of the charge pump circuitry is coupled to the second terminal of the first resistor and the first supply input of the interface circuitry.

12. The apparatus of claim 11, wherein the voltage compensation circuitry further includes:
- oscillator circuitry having an output terminal; and a logic device having a first input terminal, a second input terminal, and an output terminal, the first input terminal of the logic device is coupled to the output terminal of the comparator circuitry, the second input terminal of the logic device is coupled to the output terminal of the oscillator circuitry, the output terminal of the logic device is coupled to the input terminal of the charge pump circuitry.

13. The apparatus of claim 8, wherein the interface circuitry includes:

transmitter circuitry having an input terminal, an output terminal, a first supply terminal, and a second supply terminal, the output terminal of the transmitter circuitry is coupled to the data terminal of the USB connection; and differential-to-single-ended (D-S) converter circuitry having an output terminal, a first supply terminal, and a second supply terminal, the output terminal of the D-S converter circuitry is coupled to the input terminal of the transmitter circuitry, the first supply terminal of the D-S converter circuitry is coupled to the first output terminal of the voltage compensation circuitry and the first supply terminal of the transmitter circuitry, the second supply terminal of the D-S converter circuitry is coupled to the second output terminal of the voltage compensation circuitry.

14. The apparatus of claim 13, wherein the D-S converter circuitry further has a first input terminal and a second input terminal, the USB connection further has a bus supply terminal, and the interface circuitry further includes:

receiver circuitry having an output terminal, a first supply terminal, and a second supply terminal; and single-ended-to-differential (S-D) converter circuitry having an input terminal, a first output terminal, a second output terminal, a first supply terminal, and a second supply terminal, the input terminal of the S-D converter circuitry is coupled to the output terminal of the receiver circuitry, the first supply terminal of the S-D converter circuitry is coupled to the bus supply terminal of the USB connection and the first supply terminal of the receiver circuitry, the second supply terminal of the S-D converter circuitry is coupled to the common terminal of the USB connection and the second supply terminal of the receiver circuitry.

15. An apparatus comprising:

an amplifier configured to generate a sense voltage responsive to ground currents at a ground terminal;

voltage compensation circuitry having an input, a first output, and a second output, the voltage compensation circuitry configured to generate a compensated ground voltage at the first output and a compensated supply voltage at the second output responsive to the sense voltage at the input; and data communication circuitry having a data input, a first supply input, and a second supply input, the first supply input of the data communication circuitry coupled to the first output of the voltage compensation circuitry, the second supply input of the data communication circuitry coupled to the second output of the voltage compensation circuitry.

16. The apparatus of claim 15, wherein the input of the voltage compensation circuitry is a first input, the voltage compensation circuitry further having a second input and a third input, and the apparatus further comprising a bus connection having a data terminal, the ground terminal, and a bus supply terminal, the data terminal of the bus connection is coupled to the data terminal of the data communication circuitry, the ground terminal of the bus connection is coupled to the input of the amplifier and the second input of the voltage compensation circuitry, and the bus supply terminal of the bus connection is coupled to the third input of the voltage compensation circuitry.

17. The apparatus of claim 16, wherein the voltage compensation circuitry is further configured to:

generate the compensated ground voltage by adjusting a voltage of the ground terminal of the bus connection based on the sense voltage; and generate the compensated supply voltage by adjusting a voltage of the bus supply terminal of the bus connection based on the sense voltage.

18. The apparatus of claim 15, wherein the data communication circuitry includes:

receiver circuitry having a data input, a data output, a first supply input, and a second supply input; and single-ended-to-differential (S-D) converter circuitry having a data input, a first supply input, and a second supply input, the data input of the S-D converter circuitry is coupled to the data output of the receiver circuitry, the first supply input of the S-D converter circuitry is coupled to the first output of the voltage compensation circuitry and the first supply input of the receiver circuitry, the second supply input of the S-D converter circuitry is coupled to the second output of the voltage compensation circuitry and the second supply input of the receiver circuitry.

19. The apparatus of claim 18, wherein the S-D converter circuitry has a first data output and a second data output, and the data communication circuitry includes:

transmitter circuitry having a data input terminal, a data output terminal, a first supply terminal, and a second supply terminal; and differential-to-single-ended (D-S) converter circuitry having a first data input, a second data input, a data output, a first supply input, and a second supply input, the first data input of the D-S converter circuitry is coupled to the first data output of the S-D converter circuitry, the second data input of the D-S converter circuitry is coupled to the second data output of the S-D converter circuitry, the data output of the D-S converter circuitry is coupled to the data input of the transmitter circuitry, the first supply input of the D-S converter circuitry is coupled to the first supply input of the transmitter circuitry, the second supply input of the D-S converter circuitry is coupled to the second supply input of the transmitter circuitry.

20. The apparatus of claim 15, wherein the voltage compensation circuitry is charge pump circuitry, and the data communication circuitry is one of repeater circuitry, digital isolator circuitry, fanout circuitry, or level shifter circuitry.

* * * * *